US010661900B2

(12) United States Patent
Wu et al.

(10) Patent No.: US 10,661,900 B2
(45) Date of Patent: May 26, 2020

(54) METHOD, APPARATUS, AND KIT FOR ASSEMBLING A MOBILE PLATFORM

(71) Applicant: SZ DJI TECHNOLOGY CO., LTD., Shenzhen (CN)

(72) Inventors: Xumin Wu, Shenzhen (CN); Xiaolong Wu, Shenzhen (CN); Jiyuan Ao, Shenzhen (CN); Sungki Lee, Shenzhen (CN); Zhuang Feng, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 505 days.

(21) Appl. No.: 15/437,513

(22) Filed: Feb. 21, 2017

(65) Prior Publication Data
US 2017/0158331 A1    Jun. 8, 2017

Related U.S. Application Data

(63) Continuation of application No. PCT/CN2015/080527, filed on Jun. 1, 2015.

(51) Int. Cl.
*B64D 1/12* (2006.01)
*B64D 1/18* (2006.01)
(Continued)

(52) U.S. Cl.
CPC .............. *B64D 1/12* (2013.01); *B64C 39/024* (2013.01); *B64C 39/04* (2013.01); *B64D 1/18* (2013.01);
(Continued)

(58) Field of Classification Search
CPC ........ B64D 1/16; B64D 1/18; B64C 2201/12; B64C 2201/128
See application file for complete search history.

(56) References Cited

U.S. PATENT DOCUMENTS 9,192,947 B1 *   11/2015   Haddock .................. B64D 1/18
2014/0316614 A1   10/2014   Newman
(Continued)

FOREIGN PATENT DOCUMENTS

CN   202339962 U   7/2012
CN   202616301 U   12/2012
(Continued)

OTHER PUBLICATIONS

The World Intellectual Property Organization (WIPO) International Search Report and Written Opinion for PCT/CN2015/080527 dated Feb. 29, 2016 12 Pages.

*Primary Examiner* — Richard G Davis
(74) *Attorney, Agent, or Firm* — Anova Law Group, PLLC

(57) ABSTRACT

An apparatus and kit for assembling a mobile platform and methods for making and using the same. When associated with a mobile platform, a power device can be installed outside a control device coupled with the mobile platform. The power device can be located outside a housing enclosing the mobile platform and exposed to an external operating environment of the mobile platform. Heat generated by the power device can be dissipated without installation of additional cooling equipment. The power device and the control device can thus have lower operating temperatures and longer lifetimes. The power device can be installed on a module associated with the mobile platform for further improving heat dissipation of the power device. The module optionally can function as a shock absorber for preventing damage to the power device in case the mobile platform is involved in a crash.

12 Claims, 27 Drawing Sheets

(51) Int. Cl.
*B64C 39/04* (2006.01)
*B64C 39/02* (2006.01)
*B64C 27/50* (2006.01)

(52) U.S. Cl.
CPC ........ *B64C 27/50* (2013.01); *B64C 2201/027* (2013.01); *B64C 2201/12* (2013.01)

(56) References Cited

U.S. PATENT DOCUMENTS

2016/0355258 A1* 12/2016 Williams .............. B64C 39/024
2017/0210470 A1* 7/2017 Pardell .................... B08B 1/006
2017/0359943 A1* 12/2017 Calleija ................ A01B 79/005

FOREIGN PATENT DOCUMENTS

| | | |
|---|---|---|
| CN | 103350752 A | 10/2013 |
| CN | 203318680 U | 12/2013 |
| CN | 203727646 U | 7/2014 |
| CN | 203819498 U | 9/2014 |
| CN | 104176247 A | 12/2014 |
| CN | 204078072 U | 1/2015 |
| CN | 104608923 A | 5/2015 |
| CN | 104627361 A | 5/2015 |
| JP | 2004322836 A | 11/2004 |
| JP | 2014076676 A | 5/2014 |
| JP | 2016147519 A | 8/2016 |
| WO | 2013023565 A1 | 2/2013 |
| WO | 2015072548 A1 | 5/2015 |

* cited by examiner

METHOD, APPARATUS, AND KIT FOR ASSEMBLING A MOBILE PLATFORM

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED APPLICATION

This is a continuation application of International Application No. PCT/CN2015/080527, filed on Jun. 1, 2015, the entire contents of which are incorporated herein by reference.

FIELD

The disclosed embodiments relate generally to mobile platforms and more particularly, but not exclusively, to methods, apparatus, and kits for assembling a mobile platform, such as an unmanned aerial vehicle.

BACKGROUND

Mobile platforms, such as manned vehicles and unmanned vehicles, can be used for performing surveillance, reconnaissance, and exploration tasks for military and civilian applications. For example, an unmanned aerial vehicle (UAV) may be outfitted with a functional payload, such as sensors for collecting data from the surrounding environment or a substance to be delivered to a destination.

A power device is a component installed on a mobile platform for providing power to a portion of, or all of, components on the mobile platform that consumes power. For example, a power device on a UAV may include a battery. Generally, during an operation of the UAV, the battery internally generates a significant amount of heat. For example, a lithium battery powering the UAV can have a surface temperature ranging from about 70 degrees Celsius to about 80 degrees Celsius. The high temperature may reduce the lifetime of the battery and other components of the UAV that are installed adjacent to the battery. When the UAV does not fully dissipate the heat generated by the battery, the battery may catch a fire even during a normal operation of the UAV.

In addition, the battery is one of the heaviest components on the UAV. In the event of an accident, e.g., when a UAV crashes to the ground, an impact force of the battery on the ground may cause the battery to explode or catch a fire, resulting in a complete destruction of the UAV.

Further, some UAVs have framework and other structural components that are made of carbon fiber board because carbon fiber board has advantages such as low weight and high tensile strength. The carbon fiber board also provides space for installing a battery of a UAV. The battery can be attached to the carbon fiber board using two methods. In one method, a slot is opened on a carbon fiber board for holding a fixing tape for fixing the battery on the carbon fiber board. In the other method, a slot is opened on a carbon fiber board, and a screw can be used for fixing a battery on the carbon fiber board via the slot. Both methods require complicated procedures for installing and uninstalling the battery and may require usage of special tools.

Moreover, slots opened on a carbon fiber board using common processes usually have rough edges that may pierce the battery, and carbon fiber board is a conductor. Thus, both methods may have safety issues for a user, such as electric short circuit. When a UAV crashes to the ground in an accident, the carbon fiber board may fold upon being subjected to an impact force. The folded carbon fiber board may have a sharp tip to pierce the battery and cause the battery to burn.

In view of the foregoing, there is a need for a method and apparatus for installing a power device on a mobile platform to achieve easy installation and desired heat dissipation of the power device, reduce damage caused by the power device during an accident, and/or improve the operating condition of the power device and the entire mobile platform.

SUMMARY

The present disclosure relates to an apparatus for installing a power device and methods for making and using the same.

In accordance with a first aspect disclosed herein, there is set forth a method for assembling a mobile platform coupled with a control device, including:

installing a power device outside the control device; and
associating the power device with the mobile platform.

In some embodiments of the disclosed method, the installing includes installing a battery for powering the mobile platform, the battery being in contact with a module, for the module to dissipate heat generated by the battery during operation of the mobile platform.

In some embodiments of the disclosed method, the installing includes installing the power device on the module located outside a housing enclosing the control device.

In some embodiments of the disclosed method, the installing includes installing the power device on the module that is detached from the housing.

In some embodiments of the disclosed method, the installing includes installing the power device on the module being located below the housing when the mobile platform is in an operating position.

In some embodiments of the disclosed method, the installing includes detaching the power device from the housing.

In some embodiments of the disclosed method, the installing includes installing the power device on a skyward surface of the module when the mobile platform is in an operating position.

In some embodiments of the disclosed method, the installing includes installing the power device between the housing and the module.

In some embodiments of the disclosed method, the installing includes installing the power device on a container adapted to hold a flowable substance.

In some embodiments of the disclosed method, the installing includes installing the power device on a container adapted to hold a liquid.

In some embodiments of the disclosed method, the installing includes installing the power device on a container adapted to hold at least one of water and a pesticide.

In some embodiments of the disclosed method, the method further includes enabling the module and the mobile platform to be coupled via a quick release mechanism.

In some embodiments of the disclosed method, the method further includes enabling the module and a support member of the mobile platform to be coupled via a quick release mechanism.

In some embodiments of the disclosed method, the method further includes enabling the module and a support member of the mobile platform to be coupled via a quick release mechanism, the support member including a landing support member of the mobile platform.

In some embodiments of the disclosed method, the method further includes configuring the mobile platform to release the module and the power device upon being subjected to a predetermined impact force.

In some embodiments of the disclosed method, the configuring includes:

enabling the support member to tilt in such a way that the support member is at an angle relative to a groundward direction when the mobile platform lands on a ground;

enabling the angle to increase to a threshold angle value upon being subjected to a predetermined impact force; and enabling the mobile platform to release the module and the power device when the angle increases to the threshold angle value.

In some embodiments of the disclosed method, the enabling the support member to tilt includes enabling the support member to tilt at the angle ranging from 10 degrees to 35 degrees.

In some embodiments of the disclosed method, the configuring includes enabling the mobile platform to release the module under a threshold condition detected by a sensor associated with the mobile platform.

In some embodiments of the disclosed method, the method further includes enabling damping for the power device on the module.

In some embodiments of the disclosed method, the installing includes installing the power device on the module via a placement structure.

In some embodiments of the disclosed method, the installing includes enabling the power device to be fitted in the placement structure recessed from a surface of the module toward an interior of the module.

In some embodiments of the disclosed method, the method further includes enabling the power device to be slid into the placement structure.

In some embodiments of the disclosed method, the method further includes enabling the power device to be stopped at a predefined position in the placement structure.

In some embodiments of the disclosed method, the installing includes fixing the power device to the module using a fixing tape.

In some embodiments of the disclosed method, the associating includes electrically connecting the power device and the mobile platform.

In some embodiments of the disclosed method, the installing the power device on the container includes installing the power device on the container with an internal anti-drift structure.

In some embodiments of the disclosed method, the installing the power device on the container includes:

installing the power device on the container with an internal hollow structure; and enabling the internal hollow structure to be permeated by a liquid.

In some embodiments of the disclosed method, the installing the power device on the container includes enabling the internal hollow structure to fit through an opening of the container.

In some embodiments of the disclosed method, the installing the power device on the container includes:

installing the power device on the container with an internal spacer board inside the container, and enabling the spacer board to restrict a movement of a liquid in the container.

In some embodiments of the disclosed method, the installing includes installing the power device outside the control device coupled with the mobile platform including an unmanned aerial vehicle (UAV).

In accordance with another aspect disclosed herein, there is set forth an apparatus for installing a power device on a mobile platform associated with a control device, including:

a module for placing the power device outside the control device; and a placement structure on the module and adapted to hold the power device.

In some embodiments of the disclosed apparatus, the power device includes a battery for powering the mobile platform.

In some embodiments of the disclosed apparatus, the module is located outside a housing enclosing the control device.

In some embodiments of the disclosed apparatus, the power device is installed on the module via the placement structure.

In some embodiments of the disclosed apparatus, the module is detached from the housing.

In some embodiments of the disclosed apparatus, the module is located below the housing when the mobile platform is in an operating position.

In some embodiments of the disclosed apparatus, the power device on the module is detached from the housing.

In some embodiments of the disclosed apparatus, the power device is installed on a skyward surface of the module when the mobile platform is in an operating position.

In some embodiments of the disclosed apparatus, the power device is located between the housing and the module.

In some embodiments of the disclosed apparatus, the module includes a container adapted to hold a flowable substance.

In some embodiments of the disclosed apparatus, wherein the module includes a container adapted to hold a liquid.

In some embodiments of the disclosed apparatus, the module includes a container adapted to hold at least one of water and a pesticide.

In some embodiments of the disclosed apparatus, the module is coupled to the mobile platform via a quick release mechanism.

In some embodiments of the disclosed apparatus, the module is coupled to a support member of the mobile platform via a quick release mechanism.

In some embodiments of the disclosed apparatus, the module is coupled to a landing support member of the mobile platform via a quick release mechanism.

In some embodiments of the disclosed apparatus, the quick release mechanism is configured to release the module and the power device from the mobile platform upon being subjected to a predetermined impact force.

In some embodiments of the disclosed apparatus, the quick release mechanism is configured to:

enable the support member to tilt in such a way that the support member is at an angle relative to a groundward direction when the mobile platform lands on a ground;

enable the angle to increase to a threshold angle value upon being subjected to a predetermined impact force; and enable the mobile platform to release the module and the power device when the angle increases to the threshold angle value.

In some embodiments of the disclosed apparatus, the support member tilts at the angle ranging from 10 degrees to 35 degrees.

In some embodiments of the disclosed apparatus, the quick release mechanism is configured to:

enable the mobile platform to release the module under a threshold condition detected by a sensor associated with the mobile platform.

In some embodiments of the disclosed apparatus, the module provides the power device with a damping mechanism.

In some embodiments of the disclosed apparatus, the power device is installed on a surface of the module, the surface being made of a material having a Young's Modulus less than 20 GPa.

In some embodiments of the disclosed apparatus, the power device is installed on a surface of the module, the surface being made of a material including a polymer.

In some embodiments of the disclosed apparatus, the placement structure includes a recess on the module configured to fit a size of the power device.

In some embodiments of the disclosed apparatus, the recess includes a portion of the surface of the module sinking toward an interior of the module.

In some embodiments of the disclosed apparatus, the apparatus further includes a sliding structure on the module adapted to slide the power device into the placement structure.

In some embodiments of the disclosed apparatus, the apparatus further includes a sliding structure on the module adapted to slide the power device into the placement structure, the sliding structure including a sliding ramp.

In some embodiments of the disclosed apparatus, the apparatus further includes a barrier structure on the module for stopping the power device at a predefined position associated with the placement structure.

In some embodiments of the disclosed apparatus, the apparatus further includes a fixing structure for fixing the power device in the placement structure.

In some embodiments of the disclosed apparatus, the apparatus further includes a fixing structure for fixing the power device in the placement structure, the fixing structure including a holder for holding a fixing tape adapted to fix the power device to the module.

In some embodiments of the disclosed apparatus, the apparatus further includes an anti-drift structure adapted to be placed inside the container.

In some embodiments of the disclosed apparatus, the apparatus further includes a hollow structure adapted to be placed inside the container, the hollow structure including a shell and a hole on the shell for a liquid to flow into the hollow structure.

In some embodiments of the disclosed apparatus, the hollow structure includes a plurality of holes on the shell.

In some embodiments of the disclosed apparatus, the hollow structure has a size no greater than a size of an opening of the container.

In some embodiments of the disclosed apparatus, the hollow structure includes a hollow sphere.

In some embodiments of the disclosed apparatus, the hollow sphere has a diameter ranging from 60 mm to 100 mm.

In some embodiments of the disclosed apparatus, the hollow sphere has greater than 10 holes on the shell, each hole having a diameter ranging from 5 mm to 15 mm.

In some embodiments of the disclosed apparatus, the apparatus further includes a spacer board inside the container for restricting a movement of a liquid in the container.

In some embodiments of the disclosed apparatus, the mobile platform includes an unmanned aerial vehicle (UAV).

In accordance with another aspect disclosed herein, there is set forth an unmanned aerial vehicle (UAV) including the apparatus for installing a power device on a mobile platform associated with a control device.

In accordance with another aspect disclosed herein, there is set forth a mobile platform including the apparatus for installing a power device on a mobile platform associated with a control device.

In accordance with another aspect disclosed herein, there is set forth a method for assembling a mobile platform with a power device, including:

installing the power device on a module adapted to contain a flowable substance; and associating the power device with the mobile platform.

In some embodiments of the disclosed method, the installing includes installing the power device on the module, the module being heated by the power device during an operation of the mobile platform.

In some embodiments of the disclosed method, the installing the power device on the module includes installing the power device on the module located outside a housing enclosing a control device associated with the mobile platform.

In some embodiments of the disclosed method, the installing includes installing the power device on the module that is detached from the housing.

In some embodiments of the disclosed method, the installing includes installing the power device on the module, the module being located below the housing when the mobile platform is in an operating position.

In some embodiments of the disclosed method, the installing includes detaching the power device from the housing.

In some embodiments of the disclosed method, the installing includes installing the power device on a skyward surface of the module when the mobile platform is in an operating position.

In some embodiments of the disclosed method, the installing includes installing the power device between the housing and the module.

In some embodiments of the disclosed method, the installing includes installing the power device on a container adapted to hold a liquid.

In some embodiments of the disclosed method, the installing includes installing the power device on a container adapted to hold at least one of water and a pesticide.

In some embodiments of the disclosed method, the method further includes enabling the module and the mobile platform to be coupled via a quick release mechanism.

In some embodiments of the disclosed method, the method further includes enabling the module and a support member of the mobile platform to be coupled via a quick release mechanism.

In some embodiments of the disclosed method, the method further includes enabling the module and a support member of the mobile platform to be coupled via a quick release mechanism, the support member including a landing support member of the mobile platform.

In some embodiments of the disclosed method, the method further includes configuring the mobile platform to release the module and the power device upon being subjected to a predetermined impact force.

In some embodiments of the disclosed method, the configuring includes:

enabling the support member to tilt in such a way that the support member is at an angle relative to a groundward direction when the mobile platform lands on a ground;

enabling the angle to increase to a threshold angle value upon being subjected to a predetermined impact force; and enabling the mobile platform to release the module and the power device when the angle increases to the threshold angle value.

In some embodiments of the disclosed method, the enabling includes enabling the support member to tilt at the angle ranging from 10 degrees to 35 degrees.

In some embodiments of the disclosed method, the configuring includes enabling the mobile platform to release the module under a threshold condition detected by a sensor associated with the mobile platform.

In some embodiments of the disclosed method, the method further includes enabling damping for the power device on the module.

In some embodiments of the disclosed method, the installing includes installing the power device on the module via a placement structure.

In some embodiments of the disclosed method, the installing includes enabling the power device to be fitted in the placement structure recessed from a surface of the module toward an interior of the module.

In some embodiments of the disclosed method, the method further includes enabling the power device to be slid into the placement structure.

In some embodiments of the disclosed method, the method further includes enabling the power device to be stopped at a predefined position in the placement structure.

In some embodiments of the disclosed method, the installing includes fixing the power device to the module using a fixing tape.

In some embodiments of the disclosed method, the associating includes electrically connecting the power device and the control device.

In some embodiments of the disclosed method, the installing the power device on the container includes installing the power device on the container with an internal anti-drift structure.

In some embodiments of the disclosed method, the installing the power device on the container includes:

installing the power device on the container with an internal hollow structure; and enabling the internal hollow structure to be permeated by a liquid.

In some embodiments of the disclosed method, the installing the power device on the container includes enabling the internal hollow structure to fit through an opening of the container.

In some embodiments of the disclosed method, the installing the power device on the container includes:

installing the power device on the container with an internal spacer board inside the container; and enabling the spacer board to restrict a movement of a liquid in the container.

In some embodiments of the disclosed method, the installing includes installing the power device outside the control device coupled with an unmanned serial vehicle (UAV).

In accordance with another aspect disclosed herein, there is set forth an apparatus for installing a power device on a mobile platform, including:

a module adapted to contain a flowable substance, the power device being in contact with an exterior of the module; and a placement structure on the module and adapted to hold the power device.

In some embodiments of the disclosed apparatus, the module is heated by the power device during an operation of the mobile platform.

In some embodiments of the disclosed apparatus, the module is located outside a housing enclosing a control device associated with the mobile platform.

In some embodiments of the disclosed apparatus, the module is detached from the housing.

In some embodiments of the disclosed apparatus, the module is located below the housing when the mobile platform is in an operating position.

In some embodiments of the disclosed apparatus, the power device on the module is detached from the housing.

In some embodiments of the disclosed apparatus, the power device is installed on a skyward surface of the module when the mobile platform is in an operating position.

In some embodiments of the disclosed apparatus, the power device is located between the housing and the module.

In some embodiments of the disclosed apparatus, the module includes a container adapted to hold a liquid.

In some embodiments of the disclosed apparatus, the module includes a container adapted to hold at least one of water and a pesticide.

In some embodiments of the disclosed apparatus, the module is coupled to the mobile platform via a quick release mechanism.

In some embodiments of the disclosed apparatus, the module is coupled to a support member of the mobile platform via a quick release mechanism.

In some embodiments of the disclosed apparatus, the module is coupled to a landing support member of the mobile platform via a quick release mechanism.

In some embodiments of the disclosed apparatus, the quick release mechanism is configured to release the module and the power device from the mobile platform upon being subjected to a predetermined impact force.

In some embodiments of the disclosed apparatus, the quick release mechanism is configured to:

enable the support member to tilt in such a way that the support member is at an angle relative to a groundward direction when the mobile platform lands on a ground;

enable the angle to increase to a threshold angle value upon being subjected to a predetermined impact force; and enable the mobile platform to release the module and the power device when the angle increases to the threshold angle value.

In some embodiments of the disclosed apparatus, the support member tilts at the angle ranging from 10 degrees to 35 degrees.

In some embodiments of the disclosed apparatus, the quick release mechanism is configured to:

enable the mobile platform to release the module under a threshold condition detected by a sensor associated with the mobile platform.

In some embodiments of the disclosed apparatus, the module provides the power device with a damping mechanism.

In some embodiments of the disclosed apparatus, the power device is installed on a surface of the module, the surface being made of a material having a Young's Modulus less than 20 GPa.

In some embodiments of the disclosed apparatus, the power device is installed on a surface of the module, the surface being made of a material including a polymer.

In some embodiments of the disclosed apparatus, the placement structure includes a recess on the module configured to fit a size of the power device.

In some embodiments of the disclosed apparatus, the recess includes a portion of the surface of the module sinking toward an interior of the module.

In some embodiments of the disclosed apparatus, the apparatus further includes a sliding structure on the module adapted to slide the power device into the placement structure.

In some embodiments of the disclosed apparatus, the apparatus further includes a sliding structure on the module adapted to slide the power device into the placement structure, the sliding structure including a sliding ramp.

In some embodiments of the disclosed apparatus, the apparatus further includes a barrier structure on the module for stopping the power device at a predefined position associated with the placement structure.

In some embodiments of the disclosed apparatus, the apparatus further includes a fixing structure for fixing the power device in the placement structure.

In some embodiments of the disclosed apparatus, the apparatus further includes a fixing structure for fixing the power device in the placement structure, the fixing structure including a holder for holding a fixing tape adapted to fix the power device to the module.

In some embodiments of the disclosed apparatus, the apparatus further includes an anti-drift structure adapted to be placed inside the container.

In some embodiments of the disclosed apparatus, the apparatus further includes a hollow structure adapted to be placed inside the container, the hollow structure including a shell and a hole on the shell for a liquid to flow into the hollow structure.

In some embodiments of the disclosed apparatus, the hollow structure includes a plurality of holes on the shell.

In some embodiments of the disclosed apparatus, the hollow structure has a size no greater than a size of an opening of the container.

In some embodiments of the disclosed apparatus, the hollow structure includes a hollow sphere.

In some embodiments of the disclosed apparatus, the hollow sphere has a diameter ranging from 60 mm to 100 mm.

In some embodiments of the disclosed apparatus, the hollow sphere has greater than 10 holes on the shell, each hole having a diameter ranging from 5 mm to 15 mm.

In some embodiments of the disclosed apparatus, the apparatus further includes a spacer board inside the container for restricting a movement of a liquid in the container.

In some embodiments of the disclosed apparatus, the mobile platform includes an unmanned aerial vehicle (UAV).

In accordance with another aspect disclosed herein, there is set forth an unmanned aerial vehicle (UAV) including the apparatus for installing a power device on a mobile platform.

In accordance with another aspect disclosed herein, there is set forth a method for assembling a mobile platform with a power device, including:

enabling a module to be coupled with the mobile platform via a quick release mechanism; and installing the power device on the module.

In some embodiments of the disclosed method, the installing includes installing the power device on a module located outside a housing enclosing a control device associated with the mobile platform.

In some embodiments of the disclosed method, the installing includes installing the power device on the module, the module being located below the housing when the mobile platform is in an operating position.

In some embodiments of the disclosed method, the installing includes detaching the power device from the housing.

In some embodiments of the disclosed method, the installing includes installing the power device on a skyward surface of the module when the mobile platform is in an operating position.

In some embodiments of the disclosed method, the installing includes installing the power device between the housing and the module.

In some embodiments of the disclosed method, the installing includes installing the power device on a container adapted to hold a flowable substance.

In some embodiments of the disclosed method, the installing includes installing the power device on a container adapted to hold a liquid.

In some embodiments of the disclosed method, the installing includes installing the power device on a container adapted to hold at least one of water and a pesticide.

In some embodiments of the disclosed method, the method further includes enabling the module and a support member of the mobile platform to be coupled via the quick release mechanism.

In some embodiments of the disclosed method, the method further includes enabling the module and a support member of the mobile platform to be coupled via the quick release mechanism, the support member including a landing support member of the mobile platform.

In some embodiments of the disclosed method, the method further includes configuring the mobile platform to release the module and the power device upon being subjected to a predetermined impact force.

In some embodiments of the disclosed method, the configuring includes:

enabling the support member to tilt in such a way that the support member is at an angle relative to a groundward direction when the mobile platform lands on a ground;

enabling the angle to increase to a threshold angle value upon being subjected to a predetermined impact force; and enabling the mobile platform to release the module and the power device when the angle increases to the threshold angle value.

In some embodiments of the disclosed method, the enabling includes enabling the support member to tilt at the angle ranging from 10 degrees to 35 degrees.

In some embodiments of the disclosed method, the configuring includes enabling the mobile platform to release the module under a threshold condition detected by a sensor associated with the mobile platform.

In some embodiments of the disclosed method, the method further includes enabling damping for the power device on the module.

In some embodiments of the disclosed method, the installing includes installing the power device on the module via a placement structure.

In some embodiments of the disclosed method, the installing includes enabling the power device to be fitted in the placement structure recessed from a surface of the module toward an interior of the module.

In some embodiments of the disclosed method, the method further includes enabling the power device to be slid into the placement structure.

In some embodiments of the disclosed method, the method further includes enabling the power device to be stopped at a predefined position in the placement structure.

In some embodiments of the disclosed method, the installing includes fixing the power device to the module using a fixing tape.

In some embodiments of the disclosed method, the installing includes installing the power device outside the control device coupled with the mobile platform, the mobile platform including an unmanned aerial vehicle (UAV).

In accordance with another aspect disclosed herein, there is set forth an apparatus for installing a power device on a mobile platform, including:
  a module coupled with the mobile platform via a quick release mechanism; and
  a placement structure on the module and adapted to hold the power device.

In some embodiments of the disclosed apparatus, the module is located outside a housing enclosing a control device associated with the mobile platform.

In some embodiments of the disclosed apparatus, the module is detached from the housing.

In some embodiments of the disclosed apparatus, the module is located below the housing when the mobile platform is in an operating position.

In some embodiments of the disclosed apparatus, the power device on the module is detached from the housing.

In some embodiments of the disclosed apparatus, the power device is installed on a skyward surface of the module when the mobile platform is in an operating position.

In some embodiments of the disclosed apparatus, the power device is located between the housing and the module.

In some embodiments of the disclosed apparatus, the module includes a container adapted to hold a flowable substance.

In some embodiments of the disclosed apparatus, the module includes a container adapted to hold a liquid.

In some embodiments of the disclosed apparatus, the module includes a container adapted to hold at least one of water and a pesticide.

In some embodiments of the disclosed apparatus, the module is coupled to a support member of the mobile platform via the quick release mechanism.

In some embodiments of the disclosed apparatus, the module is coupled to a landing support member of the mobile platform via the quick release mechanism.

In some embodiments of the disclosed apparatus, the quick release mechanism is configured to release the module and the power device from the mobile platform upon being subjected to a predetermined impact force.

In some embodiments of the disclosed apparatus, the quick release mechanism is configured to:
  enable the support member to tilt in such a way that the support member is at an angle relative to a groundward direction when the mobile platform lands on a ground;
  enable the angle to increase to a threshold angle value upon being subjected to a predetermined impact force; and
  enable the mobile platform to release the module and the power device when the angle increases to the threshold angle value.

In some embodiments of the disclosed apparatus, the support member tilts at the angle ranging from 10 degrees to 35 degrees.

In some embodiments of the disclosed apparatus, the quick release mechanism is configured to enable the mobile platform to release the module under a threshold condition detected by a sensor associated with the mobile platform.

In some embodiments of the disclosed apparatus, the module provides the power device with a damping mechanism.

In some embodiments of the disclosed apparatus, the power device is installed on a surface of the module, the surface being made of a material having a Young's Modulus less than 20 GPa.

In some embodiments of the disclosed apparatus, the power device is installed on a surface of the module, the surface being made of a material including a polymer.

The apparatus of any one of claims 159-177, wherein the placement structure includes a recess on the module configured to fit a size of the power device.

In some embodiments of the disclosed apparatus, the recess includes a portion of the surface of the module sinking toward an interior of the module.

In some embodiments of the disclosed apparatus, the apparatus further includes a sliding structure on the module adapted to slide the power device into the placement structure.

In some embodiments of the disclosed apparatus, the apparatus further includes a sliding structure on the module adapted to slide the power device into the placement structure, the sliding structure including a sliding ramp.

In some embodiments of the disclosed apparatus, the apparatus further includes a barrier structure on the module for stopping the power device at a predefined position associated with the placement structure.

In some embodiments of the disclosed apparatus, the apparatus further includes a fixing structure for fixing the power device in the placement structure.

In some embodiments of the disclosed apparatus, the apparatus further includes a fixing structure for fixing the power device in the placement structure, the fixing structure including a holder for holding a fixing tape adapted to fix the power device to the module.

In some embodiments of the disclosed apparatus, the mobile platform includes an unmanned aerial vehicle (UAV).

In accordance with another aspect disclosed herein, there is set forth an unmanned aerial vehicle (UAV) including an apparatus for installing a power device on a mobile platform.

In accordance with another aspect disclosed herein, there is set forth a kit for assembling an unmanned aerial vehicle (UAV), including:
  a control device configured to control the UAV; and
  a module located outside the control device.

In some embodiments of the disclosed kit, the kit further includes a power device for powering the mobile platform.

In some embodiments of the disclosed kit, the module is configured to be located outside a housing enclosing the control device.

In some embodiments of the disclosed kit, the module is located below the housing when the mobile platform is in an operating position.

In some embodiments of the disclosed kit, the power device is installed on a skyward surface of the module when the mobile platform is in an operating position.

In some embodiments of the disclosed kit, the power device is located between the housing and the module when the mobile platform is in an operating position.

In some embodiments of the disclosed kit, the module includes a container adapted to hold a liquid.

In some embodiments of the disclosed kit, the module is adapted to couple to the mobile platform via a quick release mechanism.

In some embodiments of the disclosed kit, the module is adapted to couple to a support member of the mobile platform via a quick release mechanism.

In some embodiments of the disclosed kit, the module is adapted to couple to a landing support member of the mobile platform via a quick release mechanism.

In some embodiments of the disclosed kit, the quick release mechanism is configured to release the module and the power device from the mobile platform upon being subjected to a predetermined impact force.

In some embodiments of the disclosed kit, the quick release mechanism is configured to:

enable the support member to tilt in such a way that the support member is at an angle relative to a groundward direction when the mobile platform lands on a ground;

enable the angle to increase to a threshold angle value upon being subjected to a predetermined impact force; and enable the mobile platform to release the module and the power device when the angle increases to the threshold angle value.

In some embodiments of the disclosed kit, the support member tilts at the angle ranging from 10 degrees to 35 degrees.

In some embodiments of the disclosed kit, the quick release mechanism is configured to enable the mobile platform to release the module under a threshold condition detected by a sensor associated with the mobile platform.

In some embodiments of the disclosed kit, module includes a placement structure on the module, the placement structure includes a recess configured to fit a size of the power device.

In some embodiments of the disclosed kit, the recess includes a portion of the surface of the module sinking toward an interior of the module.

In some embodiments of the disclosed kit, the kit further includes a sliding structure on the module adapted to slide the power device into the recess.

In some embodiments of the disclosed kit, the kit further includes a sliding structure on the module adapted to slide the power device into the recess, the sliding structure including a sliding ramp.

In some embodiments of the disclosed kit, the kit further includes a barrier structure on the module for stopping the power device at a predefined position associated with the placement structure.

In some embodiments of the disclosed kit, the kit further includes a fixing structure for fixing the power device in the placement structure.

In some embodiments of the disclosed kit, the kit further includes a fixing structure for fixing the power device in the placement structure, the fixing structure including a holder for holding a fixing tape adapted to fix the power device to the module.

In some embodiments of the disclosed kit, the kit further includes an anti-drift structure adapted to be placed inside the container.

In some embodiments of the disclosed kit, the kit further includes a hollow structure adapted to be placed inside the container, the hollow structure including a shell and a hole on the shell for a liquid to flow into the hollow structure.

In some embodiments of the disclosed kit, the hollow structure includes a plurality of holes on the shell.

In some embodiments of the disclosed kit, the hollow structure has a size no greater than a size of an opening of the container.

In some embodiments of the disclosed kit, the hollow structure includes a hollow sphere.

In some embodiments of the disclosed kit, the hollow sphere has a diameter ranging from 60 mm to 100 mm.

In some embodiments of the disclosed kit, the hollow sphere has greater than 10 holes on the shell, each hole having a diameter ranging from 5 mm to 15 mm.

In some embodiments of the disclosed kit, the kit further includes a spacer board inside the container for restricting a movement of a liquid in the container.

In accordance with another aspect disclosed herein, there is set forth a kit for assembling a mobile platform, including:

a control device configured to control the mobile platform; and a module adapted to contain a flowable substance and to hold a power device, in such a way that the power device is located outside the control device after the mobile platform is assembled.

In some embodiments of the disclosed kit, the module includes a placement structure adapted to hold the power device.

In some embodiments of the disclosed kit, the module is configured to be located outside a housing enclosing a control device associated with the mobile platform.

In some embodiments of the disclosed kit, the module is configured to be detached from the housing.

In some embodiments of the disclosed kit, the module is configured to be located below the housing when the mobile platform is in an operating position.

In some embodiments of the disclosed kit, the power device is configured to be detached from the housing after the mobile platform is assembled.

In some embodiments of the disclosed kit, the power device is installed on a skyward surface of the module when the mobile platform is in an operating position.

In some embodiments of the disclosed kit, the power device is located between the housing and the module.

In some embodiments of the disclosed kit, the module includes a container adapted to hold a liquid.

In some embodiments of the disclosed kit, the module includes a container adapted to hold at least one of water and a pesticide.

In some embodiments of the disclosed kit, the module is coupled to the mobile platform via a quick release mechanism.

In some embodiments of the disclosed kit, the module is coupled to a support member of the mobile platform via a quick release mechanism.

In some embodiments of the disclosed kit, the module is coupled to a landing support member of the mobile platform via a quick release mechanism.

In some embodiments of the disclosed kit, the quick release mechanism is configured to release the module and the power device from the mobile platform upon being subjected to a predetermined impact force.

In some embodiments of the disclosed kit, the quick release mechanism is configured to:

enable the support member to tilt in such a way that the support member is at an angle relative to a groundward direction when the mobile platform lands on a ground;

enable the angle to increase to a threshold angle value upon being subjected to a predetermined impact force; and enable the mobile platform to release the module and the power device when the angle increases to the threshold angle value.

In some embodiments of the disclosed kit, the support member tilts at the angle ranging from 10 degrees to 35 degrees.

In some embodiments of the disclosed kit, the quick release mechanism is configured to enable the mobile platform to release the module under a threshold condition detected by a sensor associated with the mobile platform.

In some embodiments of the disclosed kit, the module provides the power device with a damping mechanism.

In some embodiments of the disclosed kit, the power device is installed on a surface of the module, the surface being made of a material having a Young's Modulus less than 20 GPa.

In some embodiments of the disclosed kit, the power device is installed on a surface of the module, the surface being made of a material including a polymer.

In some embodiments of the disclosed kit, the placement structure includes a recess on the module configured to fit a size of the power device.

In some embodiments of the disclosed kit, the recess includes a portion of the surface of the module sinking toward an interior of the module.

In some embodiments of the disclosed kit, the kit further includes a sliding structure on the module adapted to slide the power device into the placement structure.

In some embodiments of the disclosed kit, the kit further includes a sliding structure on the module adapted to slide the power device into the placement structure, the sliding structure including a sliding ramp.

In some embodiments of the disclosed kit, the kit further includes a barrier structure on the module for stopping the power device at a predefined position associated with the placement structure.

In some embodiments of the disclosed kit, the kit further includes a fixing structure for fixing the power device in the placement structure.

In some embodiments of the disclosed kit, the kit further includes a fixing structure for fixing the power device in the placement structure, the fixing structure including a holder for holding a fixing tape adapted to fix the power device to the module.

In some embodiments of the disclosed kit, the kit further includes an anti-drift structure adapted to be placed inside the container.

In some embodiments of the disclosed kit, the kit further includes a hollow structure adapted to be placed inside the container, the hollow structure including a shell and a hole on the shell for a liquid to flow into the hollow structure.

In some embodiments of the disclosed kit, the hollow structure includes a plurality of holes on the shell.

In some embodiments of the disclosed kit, the hollow structure has a size no greater than a size of an opening of the container.

In some embodiments of the disclosed kit, the hollow structure includes a hollow sphere.

In some embodiments of the disclosed kit, the hollow sphere has a diameter ranging from 60 mm to 100 mm.

In some embodiments of the disclosed kit, the hollow sphere has greater than 10 holes on the shell, each hole having a diameter ranging from 5 mm to 15 mm.

In some embodiments of the disclosed kit, the kit includes a spacer board inside the container for restricting a movement of a liquid in the container.

In some embodiments of the disclosed kit, the mobile platform includes an unmanned aerial vehicle (UAV).

In accordance with another aspect disclosed herein, there is set forth a kit for assembling a mobile platform, including:

a module enabled to be coupled with the mobile platform via a quick release mechanism, and a placement structure on the module and adapted to hold the power device.

In some embodiments of the disclosed kit, the module is located outside a housing enclosing a control device associated with the mobile platform.

In some embodiments of the disclosed kit, the module is detached from the housing.

In some embodiments of the disclosed kit, the module is located below the housing when the mobile platform is in an operating position.

In some embodiments of the disclosed kit, the power device on the module is detached from the housing.

In some embodiments of the disclosed kit, the power device is installed on a skyward surface of the module when the mobile platform is in an operating position.

In some embodiments of the disclosed kit, the power device is located between the housing and the module.

In some embodiments of the disclosed kit, the module includes a container adapted to hold a flowable substance.

In some embodiments of the disclosed kit, the module includes a container adapted to hold a liquid.

In some embodiments of the disclosed kit, the module includes a container adapted to hold at least one of water and a pesticide.

In some embodiments of the disclosed kit, the module is coupled to a support member of the mobile platform via the quick release mechanism.

In some embodiments of the disclosed kit, the module is coupled to a landing support member of the mobile platform via the quick release mechanism.

In some embodiments of the disclosed kit, the quick release mechanism is configured to release the module and the power device from the mobile platform upon being subjected to a predetermined impact force.

In some embodiments of the disclosed kit, the quick release mechanism is configured to:

enable the support member to tilt in such a way that the support member is at an angle relative to a groundward direction when the mobile platform lands on a ground;

enable the angle to increase to a threshold angle value upon being subjected to a predetermined impact force; and enable the mobile platform to release the module and the power device when the angle increases to the threshold angle value.

In some embodiments of the disclosed kit, the support member tilts at the angle ranging from 10 degrees to 35 degrees.

In some embodiments of the disclosed kit, the quick release mechanism is configured to enable the mobile platform to release the module under a threshold condition detected by a sensor associated with the mobile platform.

In some embodiments of the disclosed kit, the module provides the power device with a damping mechanism.

In some embodiments of the disclosed kit, the power device is installed on a surface of the module, the surface being made of a material having a Young's Modulus less than 20 GPa.

In some embodiments of the disclosed kit, the power device is installed on a surface of the module, the surface being made of a material including a polymer.

In some embodiments of the disclosed kit, the placement structure includes a recess on the module configured to fit a size of the power device.

In some embodiments of the disclosed kit, the recess includes a portion of the surface of the module sinking toward an interior of the module.

In some embodiments of the disclosed kit, the kit further includes a sliding structure on the module adapted to slide the power device into the placement structure.

In some embodiments of the disclosed kit, the kit further includes a sliding structure on the module adapted to slide the power device into the placement structure, the sliding structure including a sliding ramp.

In some embodiments of the disclosed kit, the kit further includes a barrier structure on the module for stopping the power device at a predefined position associated with the placement structure.

In some embodiments of the disclosed kit, the kit further includes a fixing structure for fixing the power device in the placement structure.

In some embodiments of the disclosed kit, the kit further includes a fixing structure for fixing the power device in the placement structure, the fixing structure including a holder for holding a fixing tape adapted to fix the power device to the module.

In some embodiments of the disclosed kit, the mobile platform includes an unmanned aerial vehicle (UAV).

In accordance with another aspect disclosed herein, there is set forth a method for carrying a flowable substance on a mobile platform, including:

enabling a container to couple with the mobile platform and to hold the flowable substance; and configuring the container to contain an anti-drift structure therein.

In some embodiments of the disclosed method, the configuring includes:

adapting the container to contain an internal hollow structure; and enabling the internal hollow structure to be permeable to the flowable substance.

In some embodiments of the disclosed method, the configuring includes enabling the internal hollow structure to fit through an opening of the container.

In some embodiments of the disclosed method, the configuring includes:

adapting the container to contain an internal spacer board inside the container, and enabling the spacer board to restrict a movement of the flowable substance in the container.

In some embodiments of the disclosed method, the enabling the container to couple with the mobile platform includes enabling the container to couple with the mobile platform including an unmanned aerial vehicle (UAV).

In accordance with another aspect disclosed herein, there is set forth an apparatus for carrying a flowable substance on a mobile platform, including:

a container adapted to couple with the mobile platform and to hold the flowable substance; and an anti-drift structure adapted to be placed inside the container.

In some embodiments of the disclosed apparatus, the anti-drift structure includes a hollow structure adapted to be placed inside the container, the hollow structure including a shell and a hole on the shell for the flowable substance to flow into the hollow structure.

In some embodiments of the disclosed apparatus, the hollow structure includes a plurality of holes on the shell.

In some embodiments of the disclosed apparatus, the hollow structure has a size no greater than a size of an opening of the container.

In some embodiments of the disclosed apparatus, the hollow structure includes a hollow sphere.

In some embodiments of the disclosed apparatus, the hollow sphere has a diameter ranging from 60 mm to 100 mm.

In some embodiments of the disclosed apparatus, the hollow sphere has greater than 10 holes on the shell, each hole having a diameter ranging from 5 mm to 15 mm.

In some embodiments of the disclosed apparatus, the method further includes a spacer board inside the container for restricting a movement of the flowable substance in the container.

In some embodiments of the disclosed apparatus, the mobile platform includes an unmanned aerial vehicle (UAV).

In accordance with another aspect disclosed herein, there is set forth an unmanned aerial vehicle (UAV) including the apparatus for carrying a flowable substance on a mobile platform.

A mobile platform, including the apparatus for carrying a flowable substance on a mobile platform.

In accordance with another aspect disclosed herein, there is set forth a kit for assembling a mobile platform, including:

a container adapted to couple with the mobile platform and to hold a flowable substance; and an anti-drift structure adapted to be placed inside the container.

In some embodiments of the disclosed kit, the anti-drift structure includes a hollow structure adapted to be placed inside the container, the hollow structure including a shell and a hole on the shell for the flowable substance to flow into the hollow structure.

In some embodiments of the disclosed kit, the hollow structure includes a plurality of holes on the shell.

In some embodiments of the disclosed kit, the hollow structure has a size no greater than a size of an opening of the container.

In some embodiments of the disclosed kit, the hollow structure includes a hollow sphere.

In some embodiments of the disclosed kit, the hollow sphere has a diameter ranging from 60 mm to 100 mm.

In some embodiments of the disclosed kit, the hollow sphere has greater than 10 holes on the shell, each hole having a diameter ranging from 5 mm to 15 mm.

In some embodiments of the disclosed kit, the kit further includes a spacer board inside the container for restricting a movement of the flowable substance in the container.

In some embodiments of the disclosed kit, the mobile platform includes an unmanned aerial vehicle (UAV).

Figure 1:
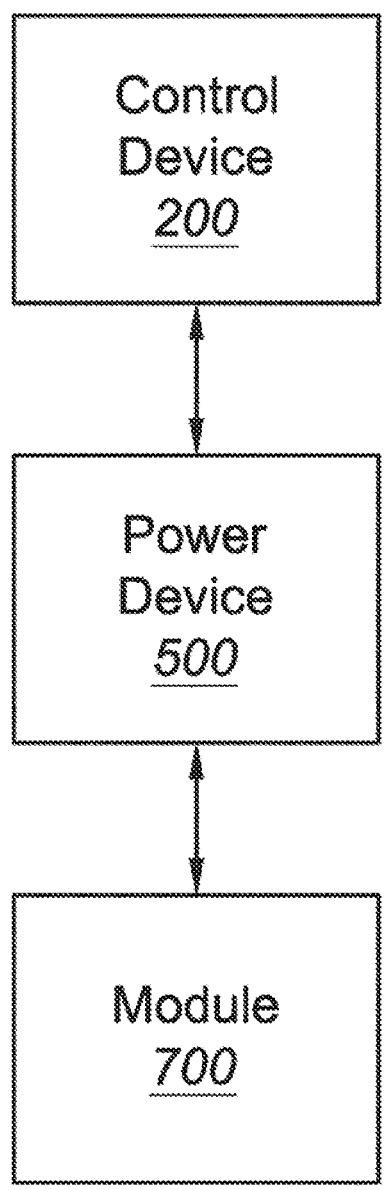
FIG. 1 is a top level block diagram illustrating an embodiment of a mobile platform with a power device.

It should be noted that the figures are not drawn to scale and that elements of similar structures or functions are generally represented by like reference numerals for illustrative purposes throughout the figures. It also should be noted that the figures are only intended to facilitate the description of the exemplary embodiments. The figures do not illustrate every aspect of the described embodiments and do not limit the scope of the present disclosure.

DETAILED DESCRIPTION OF THE EMBODIMENTS

Since currently-available power device installation on a mobile platform is incapable of providing sufficient heat dissipation and operational safety, a method, apparatus, and/or kit that optimizes heat dissipation and operational safety can prove desirable and provide a basis for a wide range of mobile platform applications. Such a method, apparatus and/or kit, for example, can enable the mobile platform to operate in harsh operating conditions, such as in a dusty, corrosive, and/or humid environment, that require the mobile platform being air sealed in a housing. This result can be achieved, according to one embodiment disclosed herein, by a mobile platform 100 as illustrated in FIG. 1.

The mobile platform 100 may refer to any appropriate apparatus that is capable of moving over a distance. Exemplary mobile platforms can include, but are not limited to, automobiles, buses, trains, aircrafts, ships, and other types of vehicles. For illustrative purposes, the mobile platform can include an Unmanned Aerial Vehicle (UAV), and an operation may include a flight of the UAV. However, wherever a UAV is described in the disclosed methods, devices and systems, the UAV may be replaced by another appropriate mobile platform, and a flight may be replaced by another operation associated with a mobile platform, without deviating from the concept covered in the scope of the present disclosure.

Turning to FIG. 1, the mobile platform 100 is shown as including a control device 200 and a power device 500. The control device 200 can include processing hardware for performing data acquisition, data processing, and any other functions and operations described herein for controlling an operation of the mobile platform 100. Without limitation, the control device 200 can include one or more general purpose microprocessors (for example, single or multi-core processors), application-specific integrated circuits, application-specific instruction-set processors, graphics processing units, physics processing units, digital signal processing units, coprocessors, network processing units, audio processing units, encryption processing units, and the like. The control device 200, for example, can include a processor (not shown) for performing at least a portion of, or all of, the disclosed functions of the control device 200. Although described as including a single transceiver for purposes of illustration only, the control device 200 can include any suitable number of uniform and/or different processors.

Additionally and/or alternatively, the control device 200 can include a transceiver, which can include RF circuitry or any other appropriate hardware and any appropriate software instructing the hardware for receiving and/or transmitting data. For example, the transceiver can receive operational commands from a remote controller and send the operational commands to the processor to execute. The transceiver can transmit data generated by the processor, such as location and/or travel speed of the mobile platform 100, to the remote controller. Although described as including a single transceiver for purposes of illustration only, the control device 200 can include any suitable number of uniform and/or different transceivers.

Additionally and/or alternatively, the control device 200 can include a sensor (not shown). The sensor can collect data of characteristics of the mobile platform 100 including, e.g., travel speed and/or posture of the mobile platform 100, temperature and % or atmospheric pressure at a location of the mobile platform 100. Exemplary sensors can include a location data unit, an odometer, an inertial measurement unit, an accelerometer, and the like. The sensor can send the collected data to the processor of the control device 200 for controlling the mobile platform 100 accordingly. Although described as including a single sensor for purposes of illustration only, the control device 200 can include any suitable number of uniform and/or different sensors.

The power device 500 in FIG. 1 can include any device that supplies power to the control device 200 and/or other component(s) of the mobile platform 100. The power device 500 can be installed outside the control device 200. Further, the power device 500 can be coupled with the control device 200 via any suitable electrical and/or mechanical connections.

FIG. 1 illustrates the mobile platform 100 as including an optional module 700. The module 700 can be coupled with the power device 500. For example, the power device 500 can be installed on the module 700. The module 700 can include a placement structure adapted to hold and/or otherwise support the power device 500 thereon.

Figure 2:
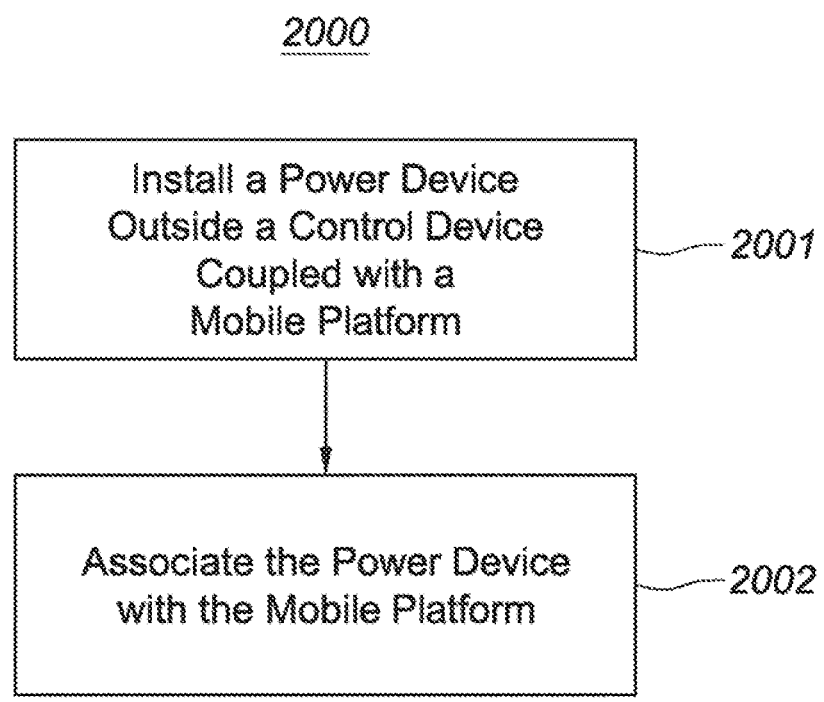
FIG. 2 is a top level flow chart illustrating an embodiment of a method for assembling the mobile platform of FIG. 1.

FIG. 2 is a top level flow chart illustrating an embodiment of a method 2000 for assembling the mobile platform 100 (collectively shown in FIG. 1). As shown in FIG. 2, the power device 500 is installed, at 2001, outside the control device 200 coupled with the mobile platform 100. By being located outside the control device 200, the power device 500 is not surrounded by, and/or in physical contact with, processors, transceivers and/or other electronic components of the control device 200. The power device 500 can be associated, at 2002, with the mobile platform 100. Associating the power device 500 with the mobile platform 100 can include forming connection between the power device 500 and the mobile platform so the power device 500 can provide power to the mobile platform and/or receive control signals from the mobile platform. Further, connection between the power device 500 and the mobile platform 100 can also enable the mobile platform 100 to carry the power device 500 during operation.

The present disclosure further discloses a method that enables the method 200 to be performed. Based on the method 2000, a method for assembling the mobile platform 100 can include enabling the power device 500 to be installed outside the control device 200 coupled with the mobile platform 100. The method can further include enabling the power device 500 to be associated with the mobile platform 100. That is, one or more components of the mobile platform 100 can be made and/or provided in such a way that the method 200 can be performed.

Further alternative embodiments of the method 2000 in FIG. 2 are illustrated in the present disclosure.

Figure 3:
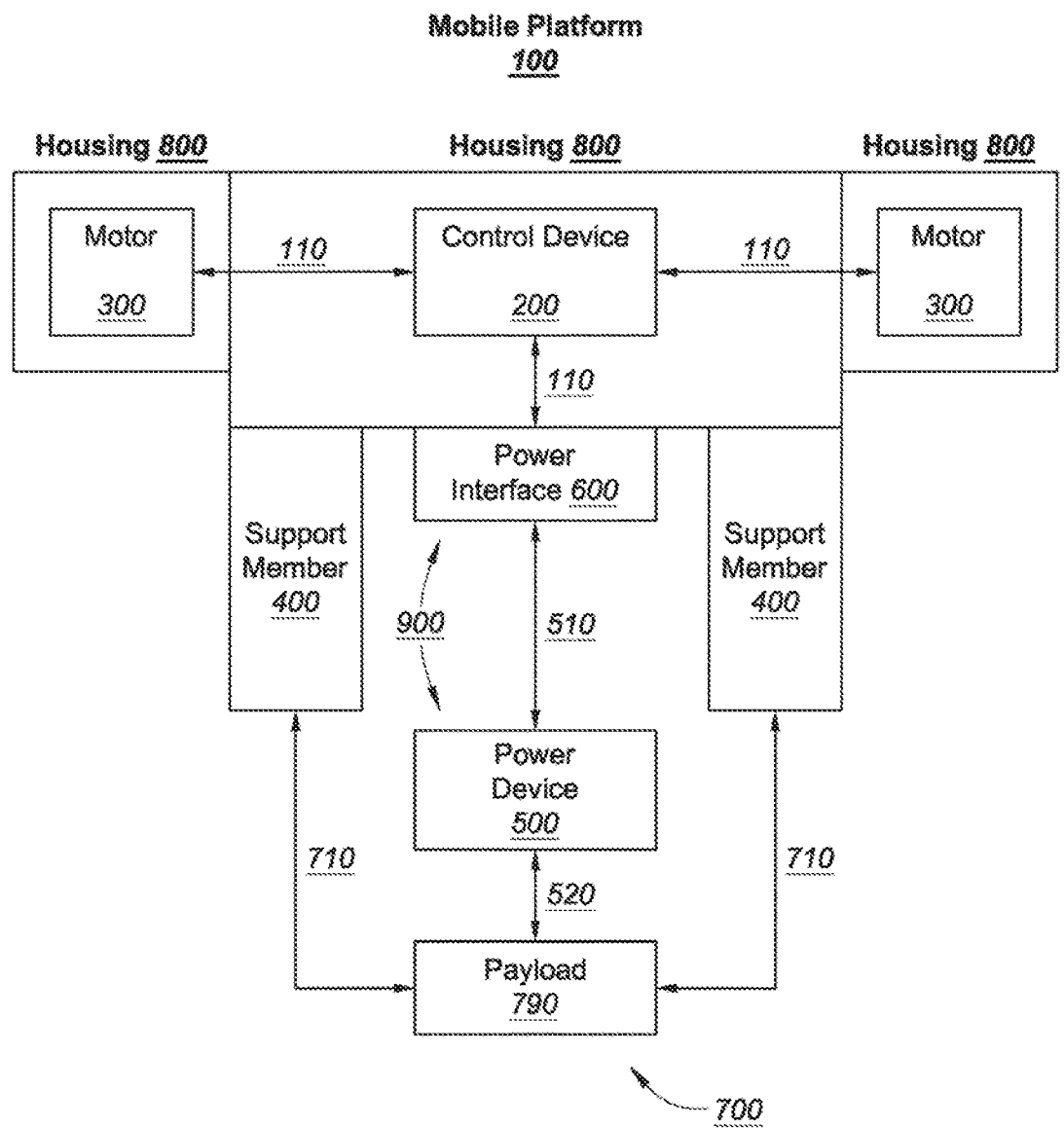
FIG. 3 is a block diagram illustrating an alternative embodiment of the mobile platform of FIG. 1, wherein the power device is installed on a module coupled with the mobile platform.

FIG. 3 is a block diagram illustrating one alternative embodiment of the mobile platform 100 of FIG. 1, wherein the power device 500 is installed on a module 700 coupled with the mobile platform 100.

As illustrated in FIG. 3, the mobile platform 100 can include the power device 500 (as shown in FIG. 1) and a power interface 600. The power device 500 may be connected to the power interface 600. In various embodiments, the power interface 600 can be connected with the control device 200, the motor 300, and/or other component(s) on the mobile platform 100 that requires a power supply. The power device 500 can be located outside the control device 200.

The power system 900 includes a power device 500 and a power interface 600. The power system 900 can include a power source (e.g., battery, alternating current (AC)), and, as desired, any other optional components, e.g., a power management system, a recharging system, a power failure detection circuit, a power converter or inverter, a power status indicator (e.g., a light-emitting diode (LED)). The power system 900 can further include an electrical socket for connecting the power source with the control device 200, the motor 300, and/or any other component(s) of the mobile platform 100 that require power. The power system 900 can further include any other component(s) associated with the generation, management and distribution of power in the mobile platform 100.

Specific arrangement and distribution of the components of the power system 900 among the power device 500 and the power interface 600 can vary based on specific applications. For example, the power system 900 may include a power converter (not shown) for changing an output voltage provided by the power device 500. In one example, the power converter can be at least partially integrated with the power interface 600. However, if a power converter can heat up significantly during operation, the power converter can be at least partially integrated with the power device 500 in order to locate the power converter far from the control device 200. By positioning the power converter far from the control device 200, transfer of the heat generated by the power converter to the control device 200 advantageously is minimized.

In one embodiment, the power device 500 can include the power source. The power source likewise can generate heat during operation of the mobile platform 100. The power source can include a battery, e.g., a lithium battery, an alkaline battery, a lead acid battery, a nickel-cadmium (NiCd) battery, a nickel-zinc (NiZn) battery, a nickel metal hydride (NiMH) battery, and/or any other conventional type of battery, without limitation. The battery can be rechargeable and/or non-rechargeable. The power source is not limited to a battery. Additionally and/or alternatively, the power source can include a photovoltaic cell, a fuel cell, and/or any other device generating power. The power interface 600 can include one or more components, e.g., the power management system and the electrical socket, of the power system 900 other than the power source.

In an alternative embodiment, the power device 500 can be at least partially integrated with the power source and/or the power converter. The power interface 600 can include component(s) of the power system 900 other than the power source and the power converter, e.g., the power management system.

Although FIG. 3 illustrates the mobile platform 100 as including one power device 500 and one power interface 600 for purposes of illustration only, the mobile platform 100 can include any suitable number of the power devices 500 and/or power interfaces 600, without limitation. A selected power device 500 can be connected to one or more of the power interfaces 600; whereas, a selected power interface 600 can be connected to one or more of the power devices 500.

The mobile platform 100 can include a motor 300 that is coupled with the control device 200. As illustrated in FIG. 3, the mobile platform 100 can include two motors 300. Each motor 300 can be configured to enable the mobile platform 100 to move, for example, according to instructions from the control device 200. For example, the control device 200 can send a control signal (not shown) to one or more selected motors 300. According to the control signal, the selected motor 300 can drive a mechanical structure, such as a propeller, to rotate. Rotation of the propeller can elevate the mobile platform 100 from the ground and travel in the air. Although shown and described with reference to FIG. 3 as having two motors 300 for purposes of illustration only, the mobile platform 100 can include any suitable number of motors 300.

The mobile platform 100 of FIG. 3 is shown as including two support members 400. The support member 400 can include any structural element to support one or both of the control device 200 and/or the motor 300. For example, in a landing position of the mobile platform 100, the support member 400 may stand on the ground and support the control device 200 and/or the motor 300. Although shown and described with reference to FIG. 3 as having two support members 400 for purposes of illustration only, the mobile platform 100 can include any suitable number of support members 400.

As shown in FIG. 3, the control device 200 and the motor 300 can be enclosed in respective housings 800. Additionally and/or alternatively, the control device 200 and the motor 300 can be enclosed in a common housing. As illustrated in FIG. 3, the power device 500 can be located outside the housing 800 and exposed to the external operating environment of the mobile platform 100.

Although FIG. 3 illustrates the power interface 600 as being outside the housing 800, the power interface 600 optionally can be at least partially integrated with the control device 200 and/or the motor 300 and thereby become a sub-unit of the control device 200 and/or the motor 300. Further, the power interface 600 can be at least partially positioned in the same housing 800 as the control device 200 and/or the motor 300, without limitation.

The power device 500 can be coupled to the power interface 600 via a power device connection 510. The power device connection 510 can include an electrical connection for transferring power from the power device 500 to the power interface 600. The power interface 600, the control device 200 and motor 300 can be connected with each other via a signal line 110 for power transfer and/or other communications. The power device 500 thereby can supply power to the control device 200 and/or the motor 300.

Optionally, the power device connection 510 can include any other mechanical and/or electrical connection between the power device 500 and one or more other components of the mobile platform 100. For example, the power device connection 510 can include a control signal line (not shown) for controlling the power device 500. Exemplary controls of the power device 500 can include activating the power device 500, deactivating the power device 500, regulating output power, and/or the like. Further, the power device connection 510 can couple the power device 500 with the motor 300, the support member 400, and/or the housing 800.

The mobile platform 100 of FIG. 3 is shown as including an external module 700. As shown in FIG. 3, the module 700 can be located outside a housing 800 and exposed to the external operating environment of the mobile platform 100. The power device 500 can be installed on the module 700. The module 700 can be coupled with one or more other selected components of the mobile platform 100 via a module connection 710. The module connection 710 can include any electrical and/or mechanical connection between the module 700 and the mobile platform 100. In a non-limiting example, the module connection 710 can provide a communication connection and/or a structural connection between the module 700 and the support member 400 of the mobile platform 100 as illustrated in FIG. 3.

The power device 500 can be coupled with the module 700 via a power-module connection 520. The power-module connection 520 can include any mechanical and/or electrical connection between the power device 500 and the module 700. The power-module connection 520 in combination with the module connection 710 can associate the power device 500 with the mobile platform 100 via the module 700.

In one embodiment, the module 700 can include a payload 790 of the mobile platform 100. The payload 790 can refer to any item suitable for being carried by the mobile platform 100. In one example, the payload 790 can include a container 791 (shown in FIG. 8) adapted to hold and/or otherwise support a flowable substance therein. Exemplary flowable substances can include any type of liquid, gas, and/or solid, such as powder. For example, the liquid can include one or more of water (e.g., for agricultural or fire-fighting), pesticide, fertilizer, liquid-state oil spill removal agent, and/or any other chemicals. The powder can include particles. Exemplary particles can include plant seeds, oil spill removal powder, powder fire-extinguisher, and/or the like. Size and/or shape of a particle is not limited. The mobile platform 100 can distribute the substance in the module 700 to the external environment during operation. Additionally and/or alternatively, the mobile platform 100 can consume the substance in the module 700.

In another embodiment, the module 700 can include the payload 790 used for operating the mobile platform 100. In one example, the power device 500 can include a fuel cell. In that case, the payload 790 can include a container 791 (shown in FIG. 8) adapted to hold fuel (e.g., oil or gasoline) to be supplied to the power device 500. In another example, the mobile platform 100 can be powered by a gasoline-electric hybrid power source, and the module 700 can thus include the container 791 adapted to hold fuel for the gasoline-electric hybrid power source. The container 791 advantageously can include one or more internal partitions for enabling the container to hold more than one type of payload. Stated someone differently, the container 791 can define one or more internal chambers each for receiving a respective payload.

Further, the module 700 can include a solid substance that can be soft, compliant, and/or elastic and not necessarily flowable. The solid substance can be carried in the container 791 and/or without the container 791. An exemplary solid substance can include a gel, a sponge, a fabric, and/or the like.

In the manner discussed in more detail above with reference to FIG. 3, the control device 200 can be enclosed in a housing 800. The power device 500 can thus be located outside the housing 800 enclosing the control device 200. Further, if the motor 300 is enclosed in a housing 800, the power device 500 can be located outside the housing 800 enclosing the motor 300.

In certain embodiments, the housing 800 can be air sealed and/or include one or more openings for exchanging air with the operating environment. When the power device 500 is located outside the housing 800, heat dissipation from the power device 500 is not limited. Further, the power device 500 can be detached from, i.e., removed from contact with, the housing 800.

FIG. 3 illustrates the power interface 600 as connected with the control device 200 for supplying power to the control device 200. Additionally and/or alternatively, the power interface 600 can be connected with any other component(s) of the mobile platform 100 to supply power to the component.

Figure 4:
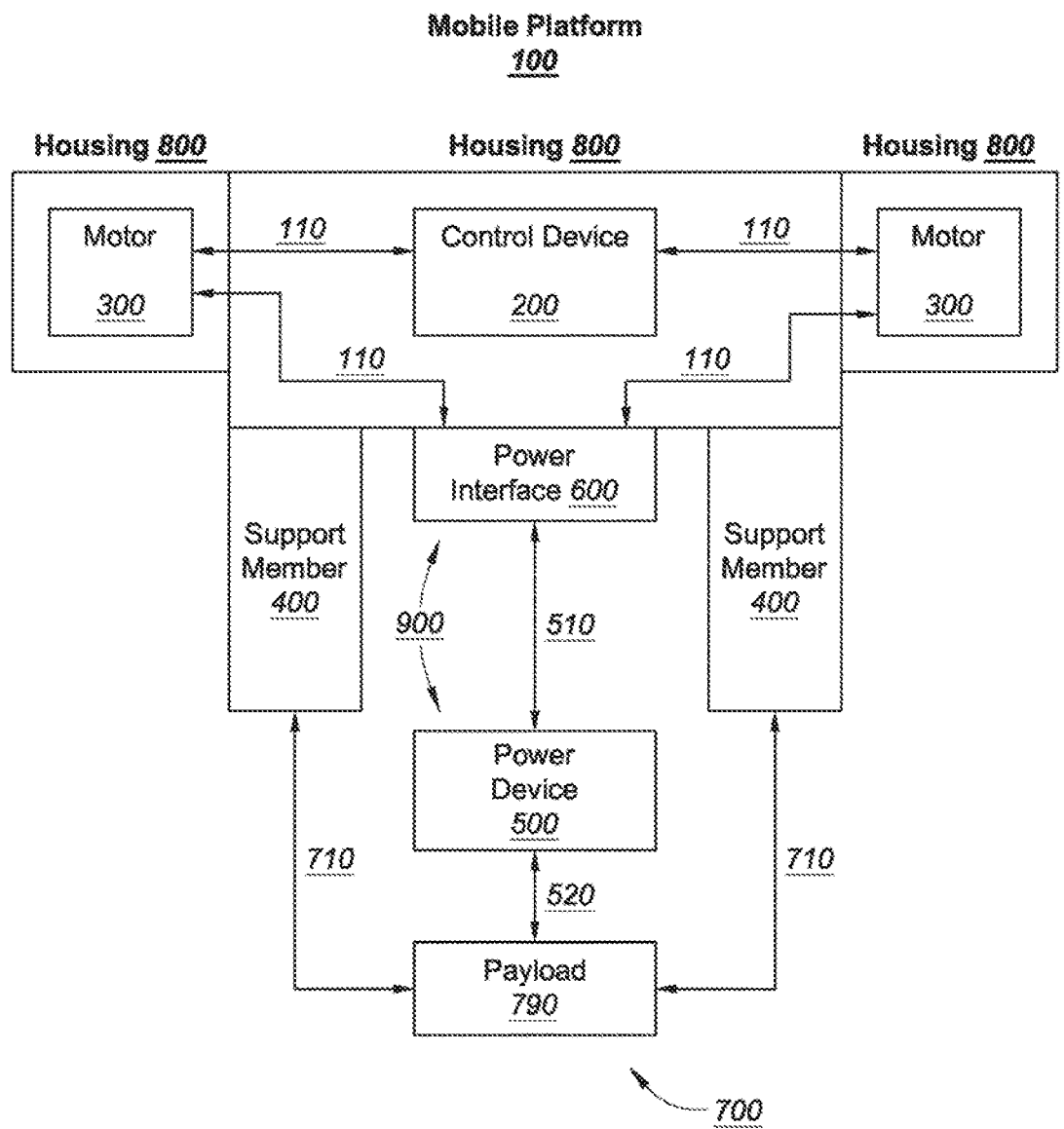
FIG. 4 is a block diagram illustrating an alternative embodiment of the mobile platform of FIG. 1, wherein the power device is installed on a module coupled with the mobile platform and supplies power to a motor on the mobile platform.

For example, FIG. 4 is a block diagram illustrating another embodiment of a power device 500 on a mobile platform 100. As shown in FIG. 4, the power device 500 is installed on a module coupled with the mobile platform and supplies power to the motor 300 on the mobile platform 100. FIG. 4 also shows that the motor 300 and the power interface 600 can have the signal line 110 therebetween. The signal line 110 can transfer power from the power interface 600 to the motor 300.

As shown in FIG. 3 and FIG. 4, the mobile platform 100 can include the module 700. As previously described, the power device 500 can be coupled with the module 700 via the power-module connection 520. The power-module connection 520 can include any mechanical and/or electrical connection between the power device 500 and the module 700. In certain embodiments, the power device 500 can be placed on the module 700. Thus, the power-module connection 520 can include placement of the power device 500 on the module 700.

The power device 500 advantageously can be installed on the module 700. For example, the module 700 can include a placement structure (not shown) adapted to incorporate and/or hold the power device 500. The placement structure can provide an engagement region of the module 700 for cooperating with the power device 500. As desired, the engagement region can comprise a geometric shape for receiving and/or engaging the power device 500, without limitation.

Figure 5:
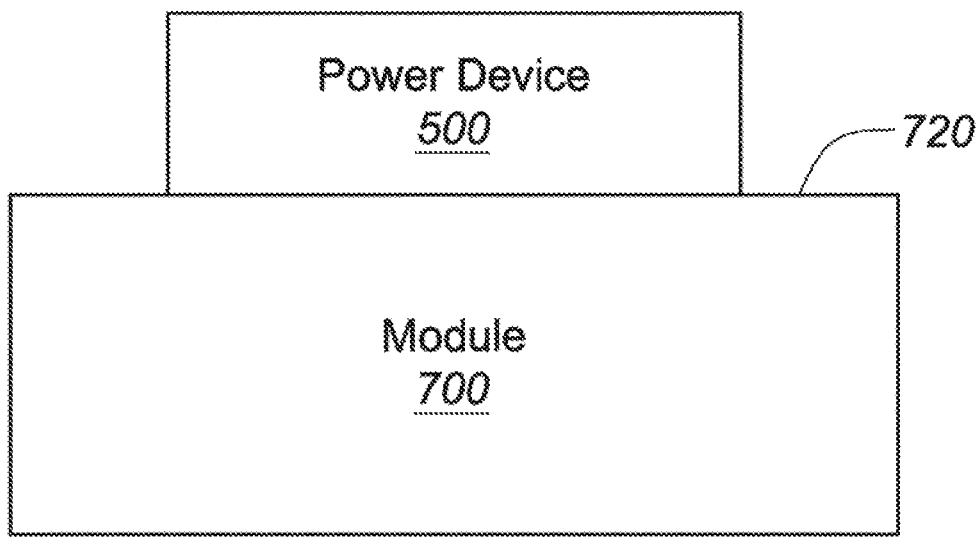
FIG. 5 is an exemplary block diagram illustrating an alternative embodiment of the power device of FIG. 3, wherein the power device is installed on the module of FIG. 3.

For example, FIG. 5 is an exemplary block diagram illustrating an embodiment of the power device 500, wherein the power device is installed on the mobile platform 100. In FIG. 5, the engagement region can include a region on a surface 720 of the module 700. FIG. 5 illustrates the power device 500 as installed on the surface 720 of the module 700. The surface 720 can have certain features for securing the power device 500 in place. For example, the surface 720 can be adhesive for adhering to the power device 500. In another example, the surface 720 and the power device 500 can each have a fastening fabric thereon, for fixing the power device to the surface 720.

Figure 6:
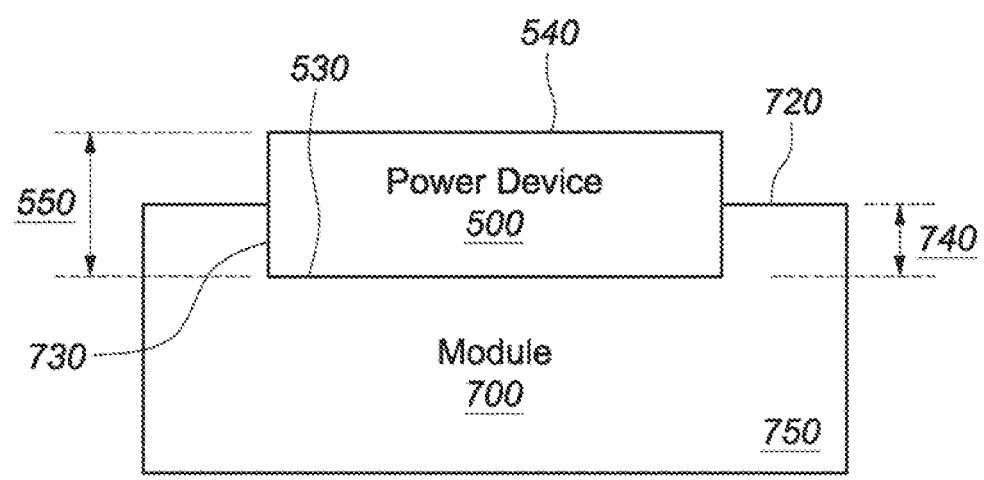
FIG. 6 is an exemplary block diagram illustrating another alternative embodiment of the power device of FIG. 3, wherein the power device is installed on the module of FIG. 3 and is positioned in a recess on a module.

The engagement region can include a recess on the module 700. For example, FIG. 6 is another exemplary diagram illustrating an alternative embodiment of the power device 500, wherein the power device is installed on the module 700. FIG. 6 illustrates the surface 720 of the module 700 as forming a recess 730 having a depth 740 extending from the surface 720 toward an interior 750 of the module 700. In other words, the recess 730 can include a portion of the surface 720 of the module 700 sinking toward the interior 750 of the module 700.

As shown in FIG. 6, the power device 500 is installed on the surface 720 of the module 700 and in the recess 730. The power device 500 can have a thickness 550. The thickness 550 can be defined as being a predetermined distance between a first surface 530 of the power device 500 for contacting the module 700 and a second surface 540 of the power device 500 opposite to the first surface 530. The thickness 550 can be equal to, less than, or greater than the depth 740 of the recess 730.

Figure 7:
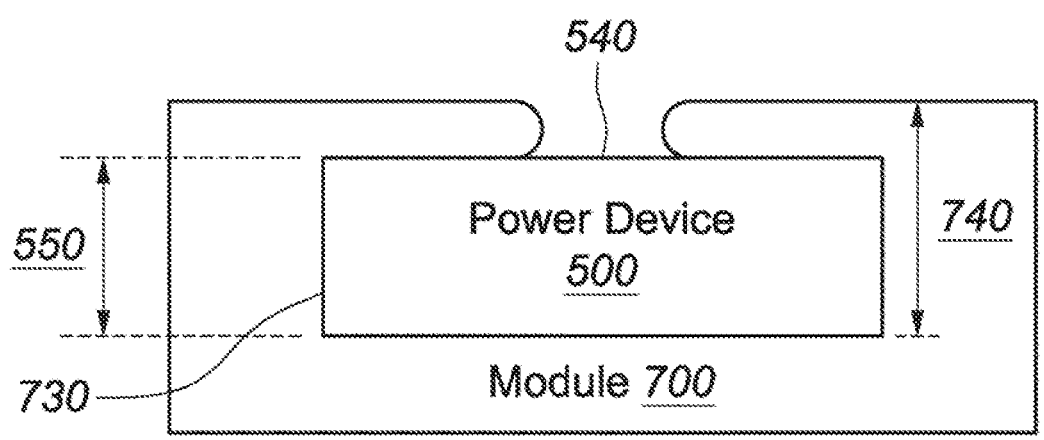
FIG. 7 is an exemplary block diagram illustrating still another alternative embodiment of the power device of FIG. 3, wherein the power device is installed on the module of FIG. 3 and is at least partially covered by a portion of a module.

FIG. 7 is an exemplary block diagram illustrating another alternative embodiment of the power device 500. As shown in FIG. 7, the power device 500 is installed on the module 700. FIG. 7 illustrates the module 700 as having a recess 730 with a depth 740 that is greater than the thickness 550 of the power device 500. A portion of the module 700 may extend over the surface 540 of the power device 500 to at least partially and/or completely cover the surface 540. By extending over the surface 540 of the power device 500, the module 700 advantageously can further increase a contact area between the power device 500 and the module 700.

Referring back to FIG. 2, the power device 500 can be associated, at 2002, with the mobile platform 100. Associating the power device 500 with the mobile platform 100 can include, for example, coupling the power device 500 with the mobile platform 100. The power device 500 and the mobile platform 100 can be coupled in any conventional manner. As previously described with reference to FIG. 3, for instance, the power device 500 can be coupled with the mobile platform 100 via the power device connection 510. Additional and/or alternatively, the power device connection 510 can include an electrical connection between the power device 500 and the power interface 600. For example, the power device 500 can be coupled with the power interface 600 via an electric cable and/or wireless power transmission technology to transmit power to the control device 200 and/or the motor 300 via the power interface 600.

Additionally and/or optionally, the power device connection 510 can include a mechanical connection between the power device 500 and the rest of mobile platform 100. For example, the power device connection 510 can include a mechanical connection to removably and/or temporarily couple the power device 500 with the support member 400 and/or the housing 800, enabling the mobile platform 100 to carry the power device 500 during operation.

In certain embodiments, the power device 500 can be installed on the module 700. Thus, associating the power device 500 with the mobile platform 100 can further include connecting the module 700 with the mobile platform 100. As previously described, the module 700 can be structurally coupled to another component of the mobile platform 100 via a module connection 710.

Although the module connection 710 is shown and described with reference to FIG. 3 as being between the module 700 and the support member 400, the module connection 710 can include any electrical and/or mechanical connection between the module 700 and any suitable component(s) of the mobile platform 100. For example, the module connection 710 can include a mechanical connection for removably/temporarily coupling the module 700 with the support member 400 and/or the housing 800, enabling the mobile platform 100 to carry the module 700 and accordingly the power device 500 during an operation.

Figure 8:
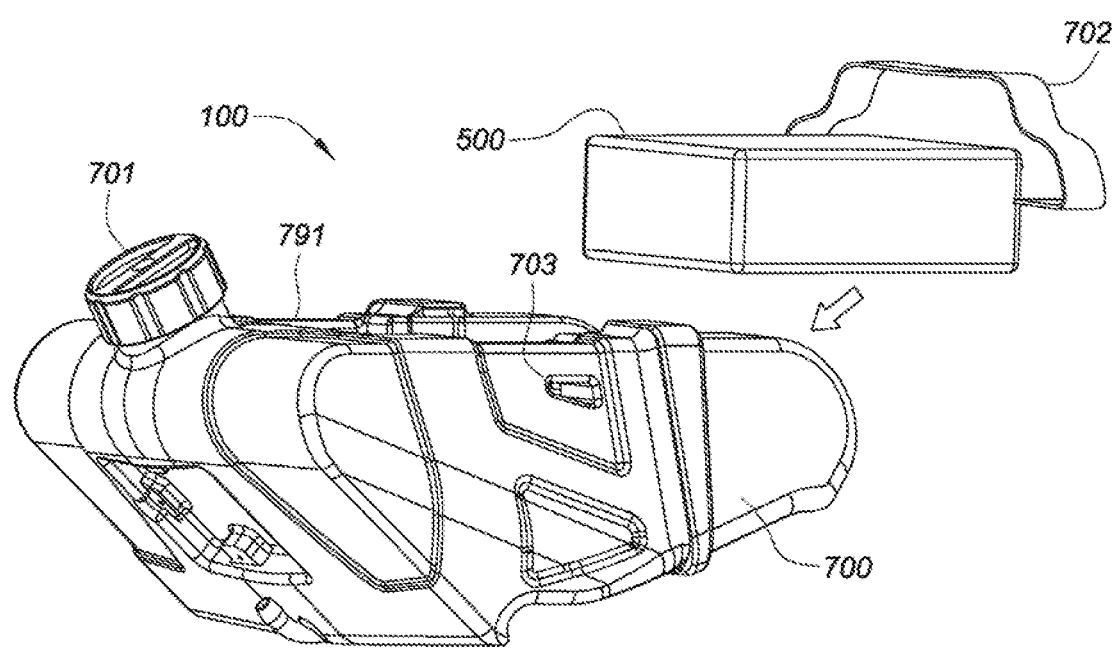
FIG. 8 is a detail drawing of an alternative embodiment of the power device of FIG. 3, wherein the power device is approaching the module in preparation for coupling with the module of FIG. 3.

Alternative embodiments of the method 2000 and associated structures of apparatus for implementing the method 2000 are described further below. FIG. 8 is a detail drawing of an alternative embodiment of the power device 500 of FIG. 3, wherein the power device 500 is shown as approaching the module 700 in preparation for coupling with the module 700. Although shown and described with reference to FIG. 8 as having a rectangular body, the power device 500 can have any conventional shape, without limitation. The power device 500 can include a battery, e.g., a lithium battery such as 12S lithium battery.

FIG. 8 depicts the module 700 as comprising a container 791 having one or more lids 701. In a non-limiting example, the container 791 can be made of a material including polymer. Exemplary polymer can include polyvinyl chloride, polyethylene, polystyrene, and/or the like. Additionally and/or alternatively, materials other than polymer can also be used. The container 791 can be made from a material that is softer and/or more compliant than the power device 500. When the module 700 and the power device 500 are installed on the mobile platform 100 that is in motion, the module 700 can provide a damping mechanism for the power device 500. When the power device 500 and the module 700 are subjected to an impact force, the module can function as a shock absorber for cushioning the impact force. Damage to the power device 500 may thus be reduced.

Optionally, a tape 702 can be used for securing and/or affixing the power device 500 on the module 700. The tape 702 can include any fixing tape adapted to affix the power device 500 to the module 700.

As shown in FIG. 8, the module 700 can include one or more holders 703 for holding the tape 702. Each holder 703 can include a structure for holding the tape 702. For example, each holder 703 can include a hole available for the tape 702 to pass through. If the module 700 includes two holders 703, for example, the tape 702 can pass through both holders 703 to form a loop for binding the power device 500 with the module 700.

Figure 9:
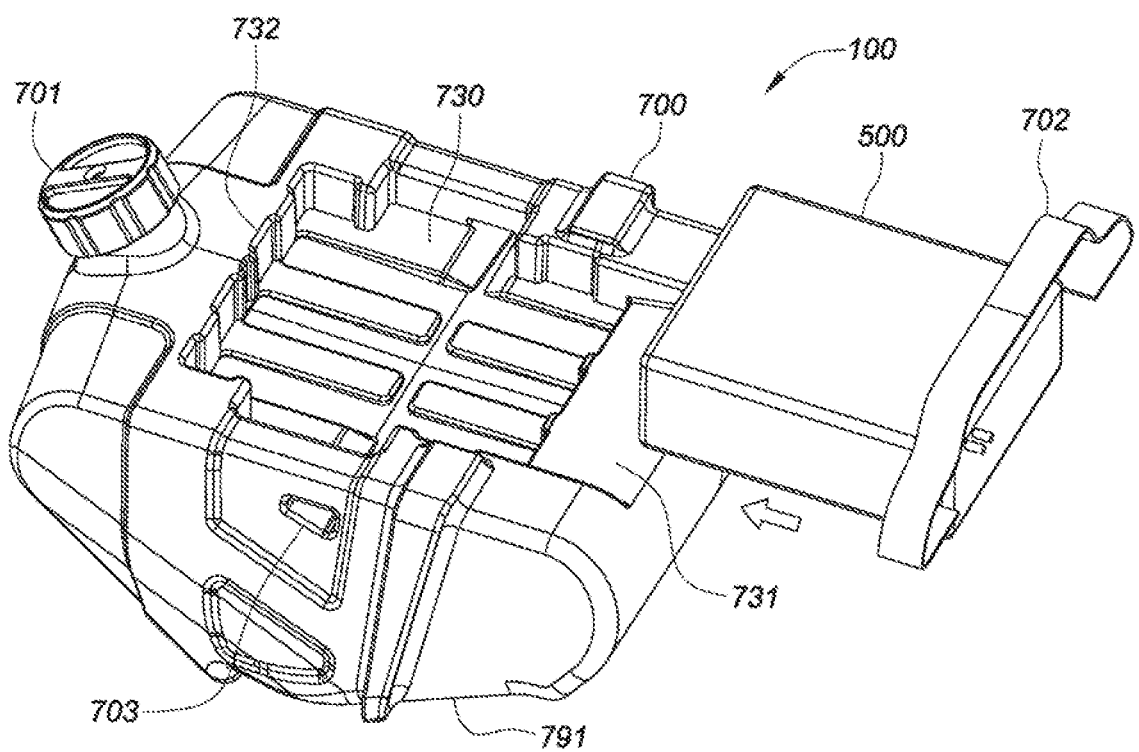
FIG. 9 is a detail drawing of another alternative embodiment of the power device of FIG. 3, wherein the power device is approaching the module in preparation for coupling with the module of FIG. 3, and a perspective view of the module and the power device is shown from a perspective different from the perspective of FIG. 8.

FIG. 9 is a detail drawing of another alternative embodiment of the power device of FIG. 3, wherein the power device 500 is shown as approaching the module 700 in preparation for coupling with the module 700. The power device 500 of FIG. 9 is shown as being coupled with the module 700. FIG. 9 also illustrates a recess 730 of the module 700. The module 700 can further include the recess 730 (as shown in FIGS. 6-7). The recess 730 can be configured to match a size of the power device 500 in such a way that the power 500 fits within the recess 730.

The module 700 can further include a sliding structure 731. An exemplary sliding structure 731 can include a ramp. The power device 500 can slide along the sliding structure 731 to enter the recess 730. Thereby, the sliding structure 731 advantageously can assist accurate placement of the power device 500.

Further, the module 700 can further include a stop 732. The stop 732 can be provided as a sidewall of the recess 730. For example, the stop 732 can comprise the sidewall on a side of the recess 730 that is opposite to the sliding structure 731. The stop 732 can define or predefine a position to stop the power device 500 when the power device 500 slides into the recess via sliding structure 731. Thus, the stop 732 can function as a barrier structure and result in accurate placement of the power device 500.

Figure 10:
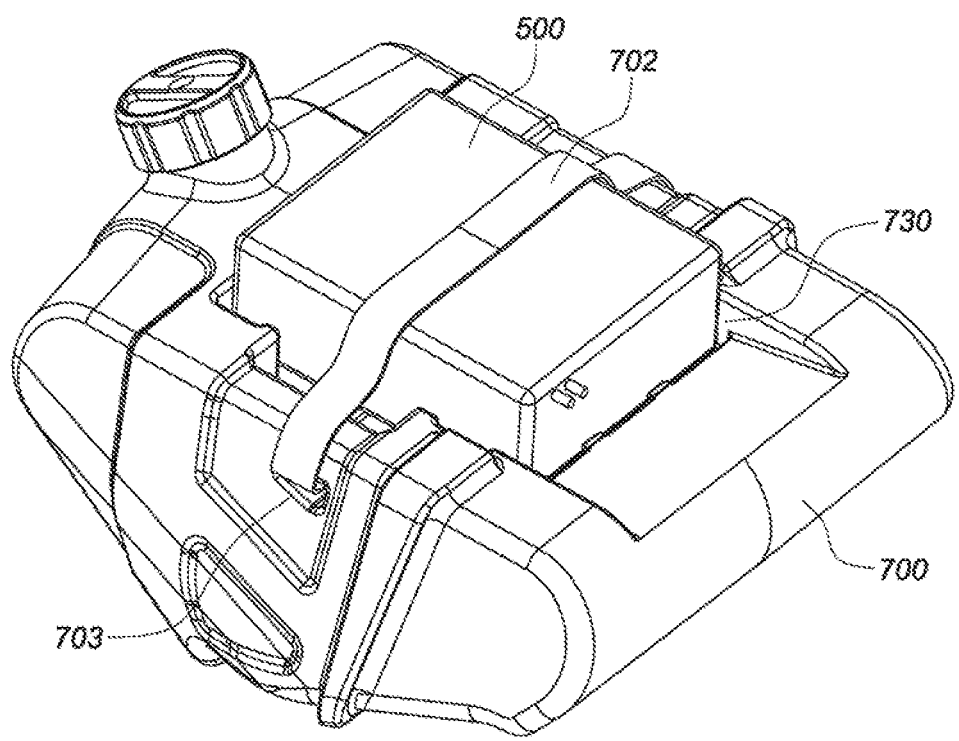
FIG. 10 is a detail drawing of still another alternative embodiment of the power device of FIG. 3, wherein a perspective view of the module and the power device is shown from a perspective different from the perspective of FIG. 9.

FIG. 10 is a detail drawing of still another alternative embodiment of the power device of FIG. 3 once the power device 500 is assembled with the module 700. As illustrated in FIG. 10, the power device 500 is placed in the recess 730 formed by the module 700. The module 700 optionally can include two holders 703. The holders 703 can be positioned on opposite sides of the recess 730 such that the tape 702 can pass through each of the holders 703 for securing the power device 500 to the module 700. Optionally, the tape 702 can be elastic and/or sticky.

Figure 11:
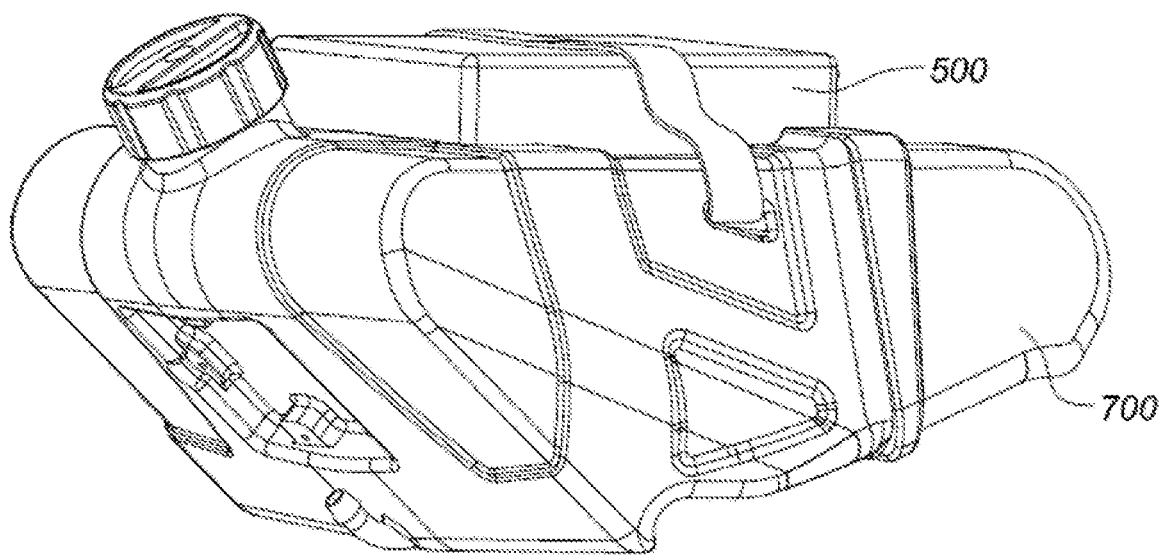
FIG. 11 is a detail drawing of still another alternative embodiment of the power device of FIG. 3, wherein a perspective view of the module and the power device is shown, and the power device is assembled with the module of FIG. 3.
Figure 12:
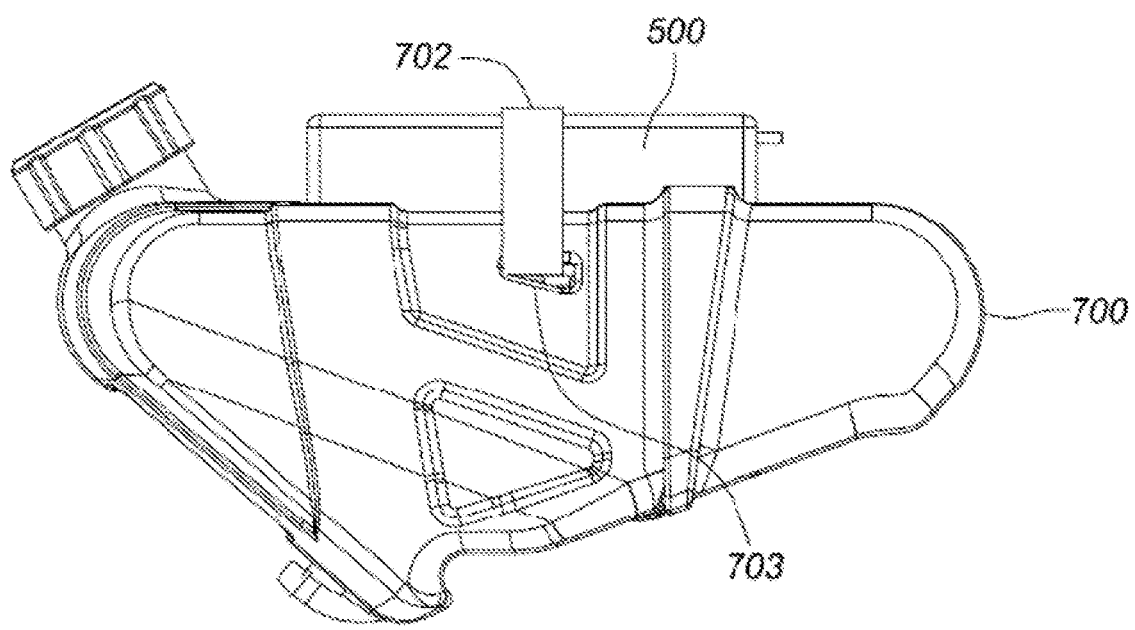
FIG. 12 is a detail drawing of still another alternative embodiment of the power device of FIG. 3, wherein a side view of the module and the power device is shown.
Figure 13:
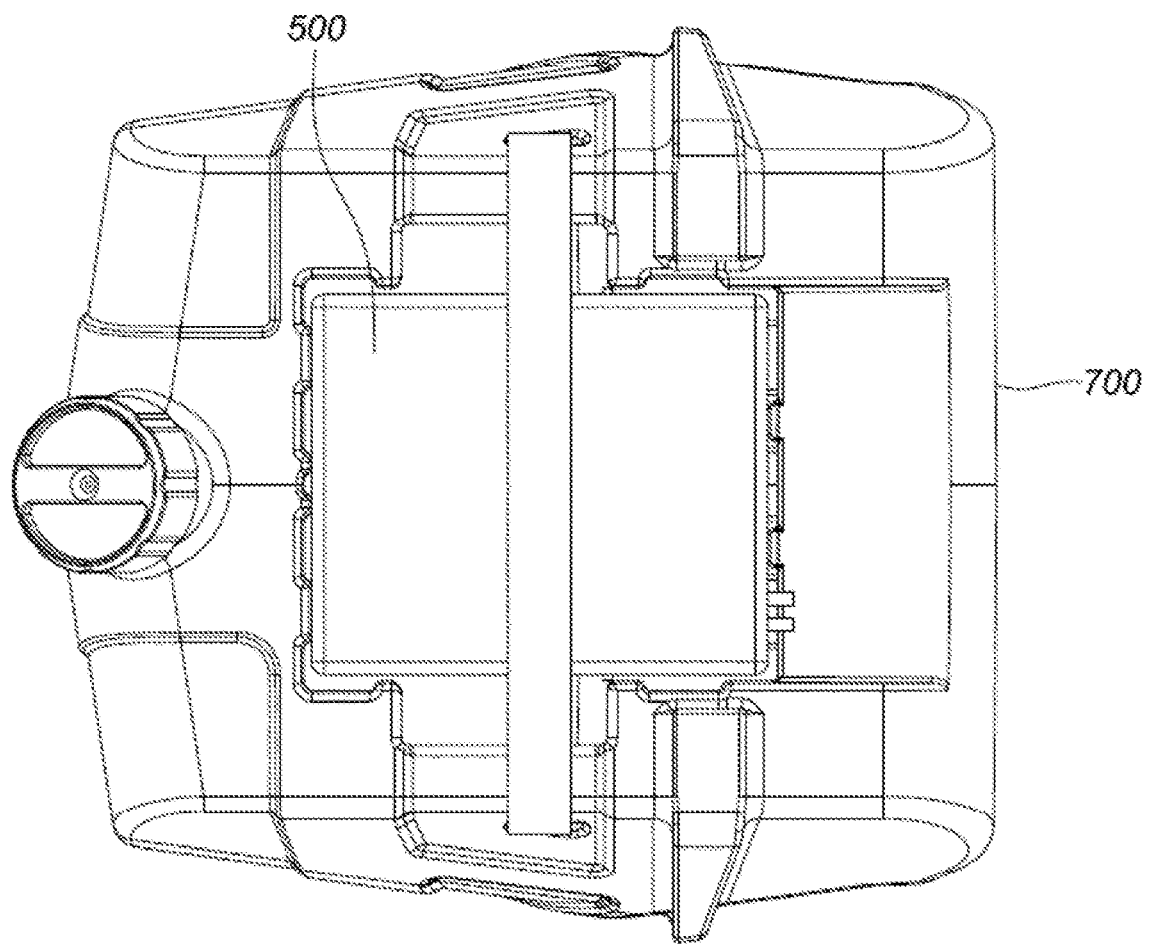
FIG. 13 is a detail drawing of still another alternative embodiment of the power device of FIG. 3, wherein a top view of the module and the power device is shown.
Figure 14:
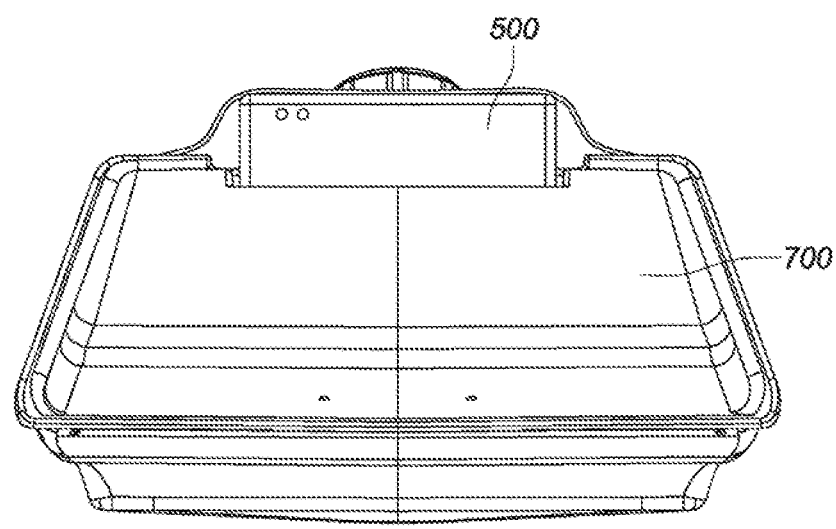
FIG. 14 is a detail drawing of still another alternative embodiment ofthe power device of FIG. 3, wherein a rear view of the module and the power device is shown.

The assembly of the power device 500 and the module 700 is further illustrated in FIGS. 11-14. FIG. 11 is a detail drawing of still another alternative embodiment of the power device 500 of FIG. 3, wherein a perspective view of the module 700 and the power device 500 is shown, and the power device 500 is assembled with the module 700 of FIG. 3. FIG. 12 is a detail drawing of still another alternative embodiment of the power device 500 of FIG. 3, wherein a side view of the module 700 and the power device 500 is shown. FIG. 13 is a detail drawing of still another alternative embodiment of the power device 500 of FIG. 3, wherein a top view of the module 700 and the power device 500 is shown. FIG. 14 is a detail drawing of still another alternative embodiment of the power device 500 of FIG. 3, wherein a rear view of the module 700 and the power device 500 is shown.

To uninstall the power device 500 from the module 700, the tape 702 can be loosened, and the power device 500 can be slide along the sliding structure 731 and removed from the recess 730. Thus, uninstallation of the power device 500 advantageously can be quick, easy, and safe.

In certain embodiments, the tape 702 may be omitted from the module 700. In one example, the surface of the recess 730 in contact with the power device 500 can include an adhesive for securing the power device 500 to the recess 730. In another example, a portion of the module 700 may extend over the surface 540 of the power device 500 to at least partially and/or completely cover the surface 540 (as shown in FIG. 7) to secure the power device 500 to the recess 730 without the tape 702.

Figure 15:
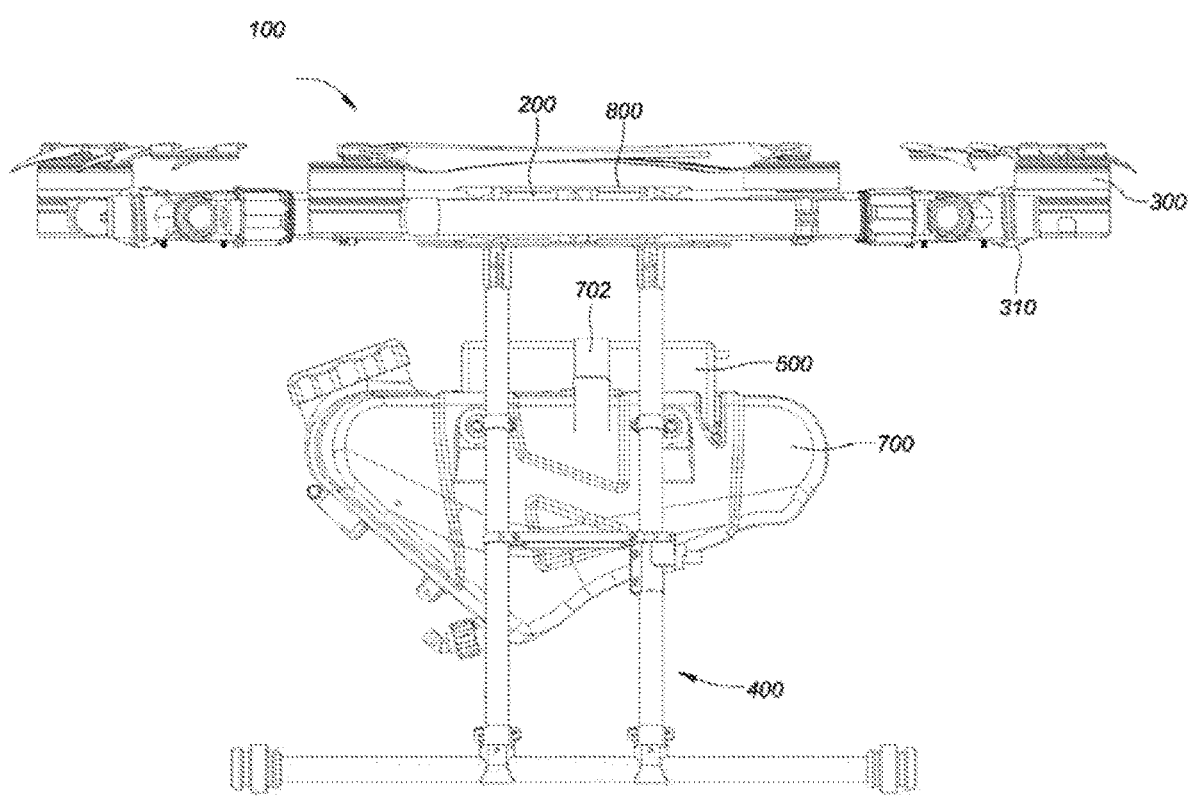
FIG. 15 is a detail drawing of an alternative embodiment of the mobile platform of FIG. 3, wherein a side view of the mobile platform is shown.

As previously described, the power device 500 can be associated with the mobile platform 100 (as at 2002 in FIG. 2). For example, FIG. 15 is a detail drawing of an alternative embodiment of the mobile platform 100 of FIG. 3, wherein a side view of the mobile platform 100 is shown. As illustrated in FIG. 15, the mobile platform 100 can be provided as an unmanned aerial vehicle (UAV) or drone. FIG. 15 illustrates the power device 500 as being installed on the module 700, which is coupled to the support member 400 of the mobile platform 100. Although shown and described here as being an unmanned aerial vehicle (UAV) for purposes of illustration only, the mobile platform 100 can be provided as any conventional type of mobile platform as discussed in more detail herein.

FIG. 15 illustrates the mobile platform 100 in an operating position. An operating position can include a posture of the mobile platform 100 for taking an action. In a non-limiting example, the posture can include orientation and/or shape of the mobile platform 100, and/or positional relationship between components of the mobile platform 100. Exemplary operating positions may include a landing position, a pre-flight position, a flight position, and/or the like.

As shown in FIG. 15, the support member 400 can extend from the mobile platform 100 downwardly (or toward the ground). The power device 500 can be located on a skyward surface of the module 700, between the module 700 and the control device 200. The power device can be separate and/or detached from the housing 800 that encloses the control device 200. Further, as illustrated in FIG. 15, the control device 200 and the motor 300 of the mobile platform 100 can be located above (closer to the sky than) the power device 500.

Figure 16:
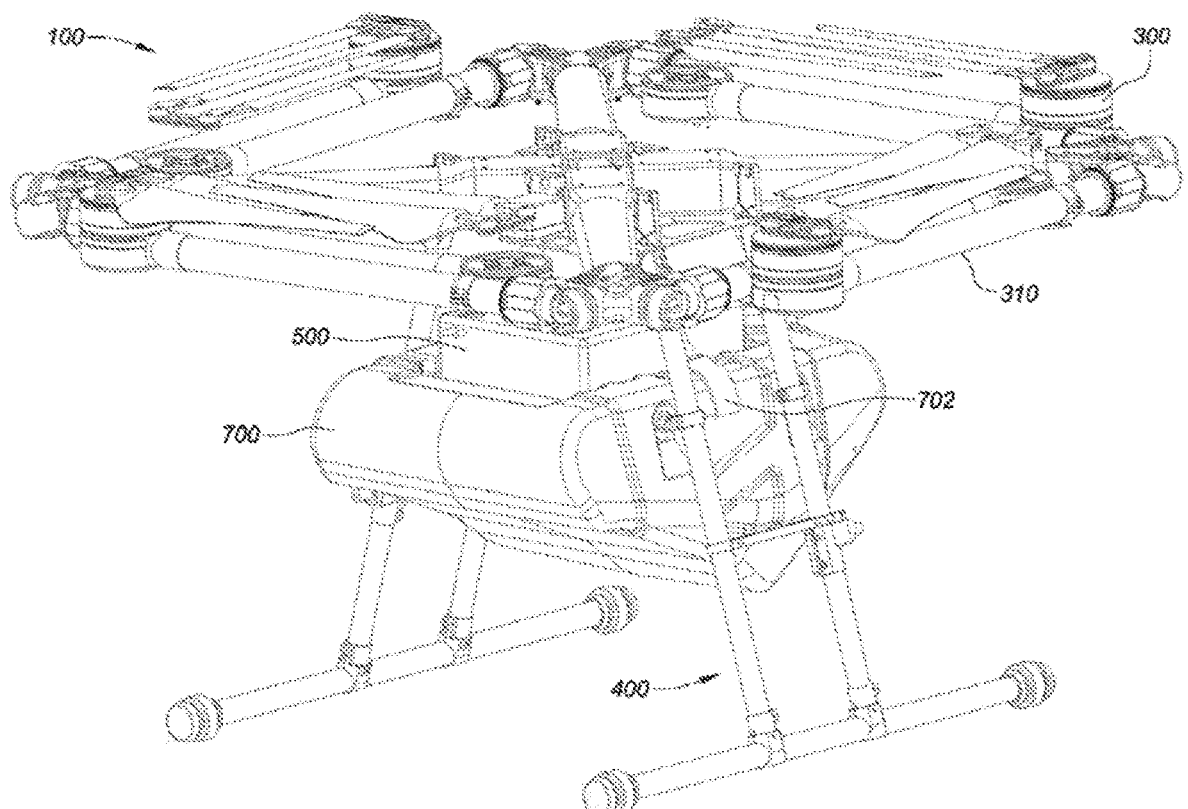
FIG. 16 is a detail drawing of another alternative embodiment of the mobile platform of FIG. 3, wherein a perspective view of the mobile platform is shown.

FIG. 16 is a detail drawing of another alternative embodiment of the mobile platform of FIG. 3, wherein a perspective view of the mobile platform is shown to further illustrate details of the exemplary mobile platform 100. As shown in FIGS. 15 and 16, an arm 310 connecting the control device 200 with the motor 300 can be folded.

Figure 17:
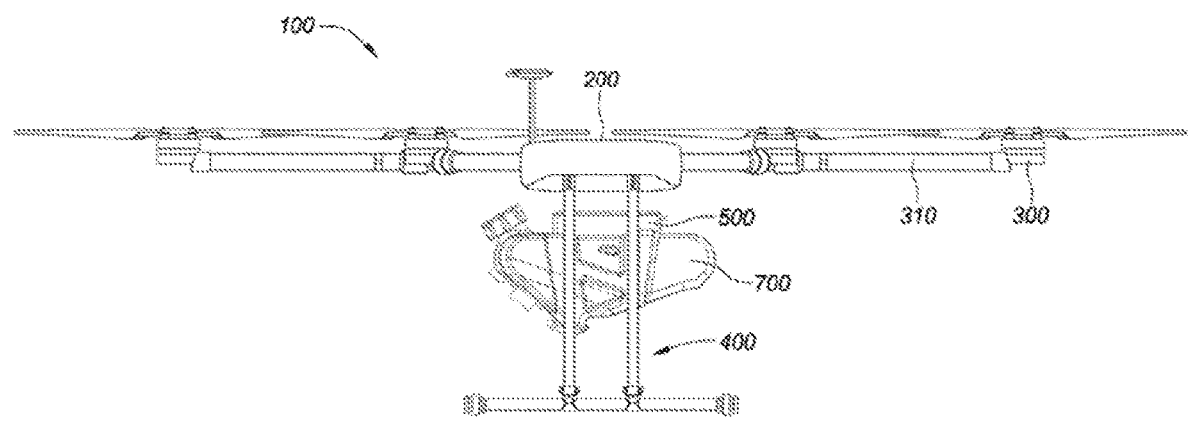
FIG. 17 is a detail drawing of still another alternative embodiment of the mobile platform of FIG. 3, wherein the mobile platform has extended motor arms.

FIG. 17 is a detail drawing of still another alternative embodiment of the mobile platform of FIG. 3, wherein the mobile platform has extended motor arms and the power device 500 is installed outside the control device 200 in accordance with the method 2000 of FIG. 2. In FIG. 17, the arm 310 connected to each motor 300 is extended, in comparison with the arm 310 being in FIG. 16. Further, the tape 702 in FIGS. 15-16 is omitted in FIG. 17.

FIGS. 15-17 show the module 700 as having one skyward surface when the mobile platform 100 is in an operating position, and the power device 500 is installed on the skyward surface. However, the module 700 can have a different shape from the shape as shown in FIGS. 15-17, and the power device 500 can be installed on a surface of the module 700 facing any direction, without limitation.

In various embodiments, the power device 500 can be installed on a skyward surface of the module 700. A skyward surface can refer to a surface completely or partially skyward. A completely skyward surface can face a direction pointing to the sky (i.e., a completely skyward direction) during normal operation of the mobile platform. A partially skyward surface can face a direction away from the completely skyward direction by an angle that is greater than 0 degree and less than 90 degrees. The module 700 can have multiple skyward surfaces when the mobile platform 100 is in a certain operating position, depending on the specific shape and specific orientation of the module 700.

In various embodiments (e.g., in FIGS. 15-17), the module 700 and the power device 500 are shown as not being enclosed in a housing 800 in an operating position. However, the mobile platform 100 can have multiple operating positions. A structure of the mobile platform 100 can be adjusted based on the specific positions. For example, a housing 800 can be configured to enclose the power device 500 and/or the module 700 when the mobile platform 100 is in a landing position when the mobile platform 100 lands on the ground. In a landing position, the power device 500 and/or the module 700 can be retrieved into the housing 800 by an elevator structure. In that case, the power device 500 and/or the module 700 can be released out of the housing 800 by the elevator structure in a flight position.

During an operation of the mobile platform 100, the power device 500 can generate a significant amount of heat. If the power device 500 is positioned within an enclosed housing 800 where the heat cannot be dissipated sufficiently, the lifetime of the power device 500 can be significantly reduced. When a housing 800 encloses the power device 500 as well as the control device 200 and/or the motor 300, the heat dissipation may be limited in such a way as to reduce the lifetime of devices of the control device 200 and/or the motor 300, and even to start a fire.

Certain conventional mobile platforms, such as UAVs, enclose the power device 500 in a housing that has a partially open structure. That is, heat dissipation holes are opened on the housing for exchanging air between interior of the housing and exterior of the housing. However, for certain applications, the UAV may need to be operated in a harsh environment including, e.g., corrosive, dusty, and/or humid air. In those cases, air sealing the electronic components (e.g., control device, motor) of the UAV is desirable. The heat dissipation of an air sealed UAV can be significantly limited. The power device 500, such as a battery, thus can become a safety hazard. A cooling system may be installed in the housing 800 to cool the power device. The cooling system can add significant weight to the UAV and thus considerably reduce flight time of the UAV.

According to the method 2000 of FIG. 2 and mobile platform 100 of FIGS. 3-17, the power device 500 can be exposed to exterior environment of the mobile platform 100. Thus, the power device 500 can have the generated heat quickly dissipated into the surrounding air.

Further, the power device 500 can be installed on the module 700 that can also be located outside a housing 800 and exposed to the exterior environment of the mobile platform 100. In certain embodiments, the module 700 can include a container for holding one or more flowable substances, such as water, pesticide, and the like. Heating the flowable substances generally requires a great amount of heat. Therefore, the flowable substances in the module 700 can further cool down the power device 500.

As shown in FIGS. 6-14, the power device 500 can be located in a recess 730 on the module 700. The contact area between the power device and the module 700 can be adjusted by varying the size and shape of the recess 730. A greater contact area can result in greater heat dissipation. In FIGS. 5-14, the contact area can range from the surface area of one side of the power device 500 to the surface area of multiple sides of the power device 500. Thus, desired heat dissipation can be achieved.

Further, certain UAVs may be used for spraying the flowable substance(s), such as water and/or pesticide, contained in the module 700. Thus, during an operation, the exterior air of the UAV can become corrosive and humid. A UAV thus needs to air seal various electronic components in a housing 800. Locating the power device 500 out of the housing 800 and on the module 700 can fully utilize the module 700 to solve the heat dissipation problem without introducing additional equipment. On the other hand, the module 700 does not necessarily include the container 791 for holding the flowable substance. The module 700 can include the payload 790 and/or the power device support for supporting the power device 500.

Further, as shown in FIGS. 8-14, installing the power device 500 on the module 700 advantageous utilizes simple and safe manual operations without a need for special tools. Danger of electrical short circuit can also be minimized.

Still further, as previously described, when the power device 500 and the module 700 are subjected to an impact force, the module 700 can function as a shock absorber for cushioning the impact force on the power device 500. Damage to the power device 500 advantageously can be reduced. In the event of a crash of a UAV when the power device 500 and the module 700 fall to the ground, the module 700 may land between the power device 500 and the ground to absorb the shock in the crash and prevent the power device 500 from breaking apart or catching a fire.

In addition, the module 700 can be further coupled with the mobile platform 100 via a reinforcement structure (not shown). The reinforcement structure can be installed on a portion of the module 700 other than a position of the power device 500, to avoid interfering with shock absorbing effect of the module 700 for the power device 500. The reinforcement structure can include any conventional structures (e.g., metallic framework installed on edge of the module 700), to restrict movement of the module relative to the mobile platform 100 and increase structural strength of module 700.

In addition, conventionally, a control device and a power device are enclosed in a common housing, and/or the power device is located above the control device. In the event of a crash, the power device can be subjected to a significant impact force and may transfer the impact force to the control device. In some cases, the power device can fall onto, and crush, the control device. However, in FIGS. 15-17, in an operating position of the mobile platform 100, the control device 200 can be located above the power device 200. As the module 700 may land between the power device 500 and the ground to absorb the shock for the power device 500, the control device 200 and the motor 300 can fall on the power device 500. The control device 200 is generally significantly lighter than the power device 500, so damage to the control device 200 can be considerably reduced.

Protection to the mobile platform 100 can be further enhanced by releasing the power device 500 from the rest of the mobile platform 100 during a crash. A quick release mechanism can be used for associating the power device 500 with the mobile platform 100.

In certain embodiments, the module 700 can be coupled with the mobile platform 100 using the quick release mechanism, so the power device 500 can be released from the mobile platform 100 when installed on the module 700.

Figure 18:
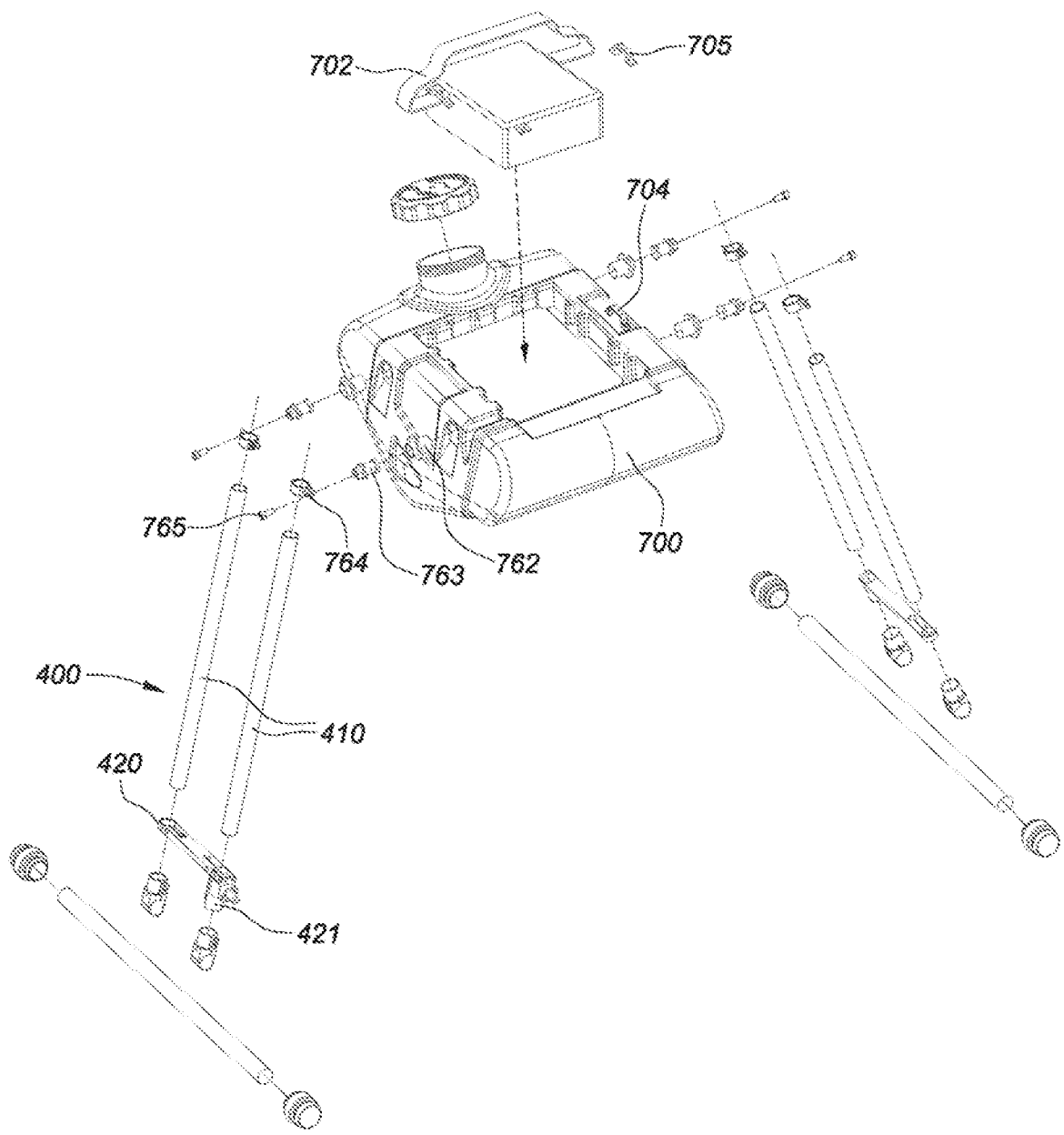
FIG. 18 is a detail drawing of still another alternative embodiment of the mobile platform of FIG. 3, wherein an exploded-view diagram of the power device, the module and the support member is shown.

FIG. 18 is a detail drawing of still another alternative embodiment of the mobile platform 100 of FIG. 3, wherein an exploded-view diagram of the power device 500, the module 700 and the support member 400 is shown. FIG. 18 shows an assembly including the power device 500, the module 700 and the support members 400 of FIG. 3. In FIG. 18, the module 700 can include two recessive slots (not shown) on each of the two opposite side surfaces, respectively. A fixing column stopper 762 can be plugged into the recessive slot. The fixing column stopper 762 can include a plug made of an elastic material, e.g., a rubber plug. The fixing column stopper 762 can include a concaved slot to receive a fixing column 763.

The fixing column 763 can be connected to a support member 410 that is a portion of the support member 400. The support member 410 can include a bar-shaped structure. For example, the support member 410 can be encircled in a fixture 764 having a hoop shape. The fixture 764 encircling the support member 410 can be connected to the fixing column 763 using a screw 765 (e.g., an M5 screw or the like).

Optionally, two adjacent support members 410 can be connected with each other via a crossbeam fixture 420. The crossbeam fixture 420 can be shaped to include a spray bar fixture 421 used for holding a spray head or sprinkler head for spraying the liquid contained in the module 700.

As previously mentioned, the module 700 can include a holder 703 for holding the tape 702. In one example, the holder 703 can include a hole defined by surface shape of the module 700 (as in FIG. 10). In another example, the holder 703 can include one or more tape holder slots 704 formed adjacent to the recess 730. The holder slots 704 can be defined by the surface shape of the container. A lock ring 705 can snap into the holder slots 704 to form a hole for the tape 702 to pass through.

Figure 19:
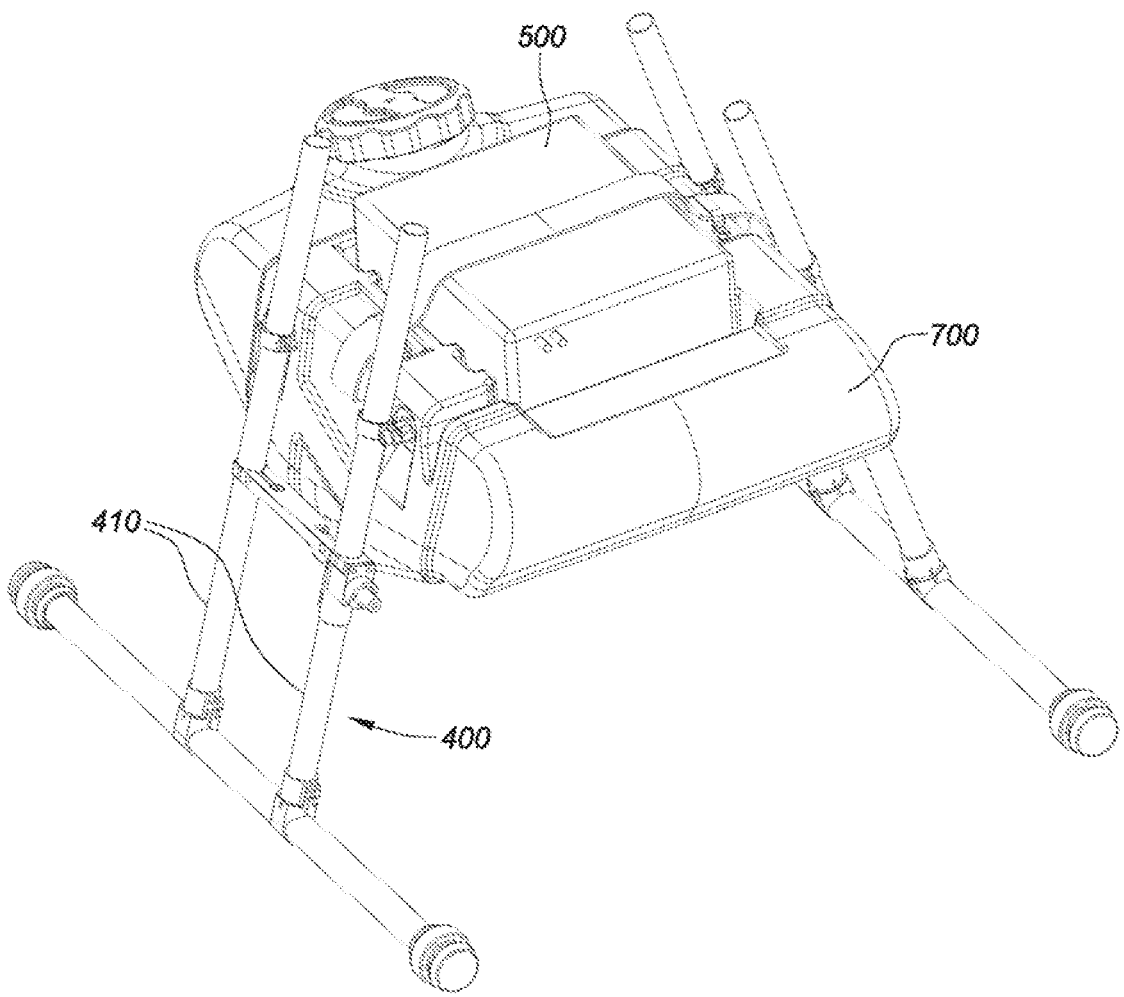
FIG. 19 is a detail drawing of still another alternative embodiment of the mobile platform of FIG. 3, wherein the power device, the module and the support member are assembled.

FIG. 19 is a detail drawing of still another alternative embodiment of the mobile platform 100 of FIG. 3, wherein an assembly including the power device 500, the module 700 and the support member 400 is shown. The mobile platform 100 can include the assembly in FIG. 19 in an operating position. When the mobile platform 100 includes the assembly in FIG. 19 in a landing position, the support member 400 can be used as a landing support member of the mobile platform 100.

When the mobile platform 100 lands on a ground, the support member 400 can tilt in such a way that the support member 410 is at an angle (i.e., an initial angle) relative to a groundwardly direction. For example, the angle can range from 10 degrees to 35 degrees.

In the event of a crash, upon touching the ground, the support member 410 can be subjected to an impact force. The support member 410 is coupled with the module 700 via the fixing column stopper 762 rather than a rigid connection. Therefore, when the impact force is equal to or greater than a predetermined impact force, the support member 410 can be tilted at an angle greater than the initial angle, pull the fixing column stopper 762 out of the recessive slot, and release the module 700. Thus, the module 700 assembled with the power device 500 can be released from the rest of the mobile platform 100, and falls separately from the control device 200 and the motor 300.

Generally, when the mobile platform 100 includes a UAV, a total weight of the module 700 filled with a flowable substance and the power device 500 can be greater than a weight of the mobile platform 100. In some cases, a total weight of an empty module 700 and the power device 500 can be greater than a weight of the rest of the mobile platform 100. When the quick release mechanism is used, even when the power device 500 is still subjected to an impact force, the power device 500 does not transfer the impact force to the control device 200. The control device 200 is much lighter than the power device 500 and the module 700, so the crash may not result in a significant damage to the control device 200.

Figure 20:
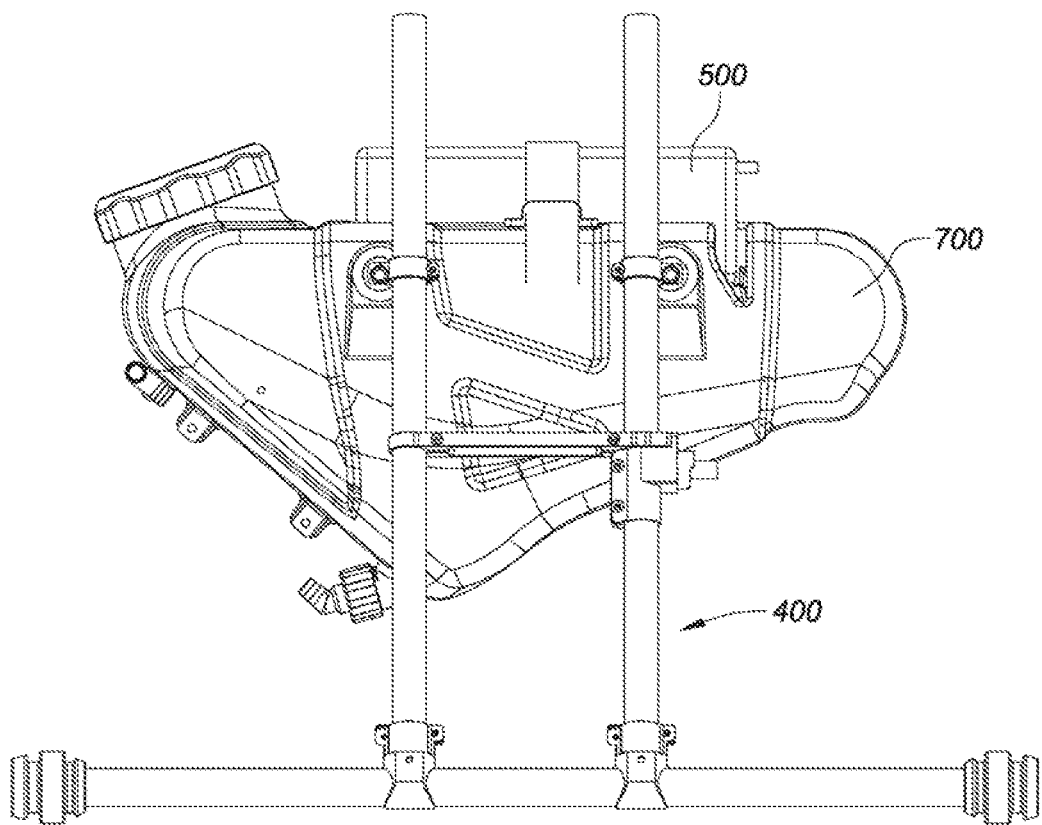
FIG. 20 is a detail drawing of still another alternative embodiment of the mobile platform of FIG. 3, wherein the power device, the module and the support member are assembled.

Further, in the event when the power device 500 still catches a fire, the control device 200 is released from the power device 500 and can be prevented from being burned. Damage to the mobile platform 100 can thus be significantly reduced. FIG. 20 is a detail drawing of still another alternative embodiment of the mobile platform 100 of FIG. 3 once the power device 500, the module 700 and the support member 400 are assembled.

The quick release mechanism can include mechanisms in addition/alternative to the structure shown in FIG. 18. For example, the power device 500 and/or the module 700 can be released upon being subjected to a threshold condition. The control device 200 and/or the motor can determine wither the threshold condition is met.

In one example, the support member 400 can be controlled by the control device 200 electronically. Via a sensor, the control device 200 can determine that a threshold condition is reached. The threshold condition can include, e.g., the mobile platform 100 is descending at a speed faster than a threshold descending speed. The control device 200 can then instruct the support member 400 to increase the tilting angle of the support member 410 to release the power device 500 and/or the module 700. In another example, via a sensor, the control device 200 can determine that the support member 410 is touching the ground with an impact force greater than a threshold descending speed. The control device 200 can then increase the tilting angle of the support member 410 to release the power device 500 and/or the module 700.

Further, to achieve a quick release mechanism, any electrical/mechanical connection can be used for associating the power device with the mobile platform 100, not limited to the fixing column stopper 762 in FIG. 18. For example, the module 700 can rest on support rods or support platens installed on each support member 410. The support member 410 can increase the tilting angle and/or move laterally away from the module 700 to release the module 700.

Moreover, the power device 500 and/or the module 700 can be coupled to the mobile platform 100 without using the support member 400, and the quick release mechanism can also function. For example, the module 700 can be connected to a fixture located on the external wall of the housing 800. The fixture can be controlled by the control device 200 to release the module 700 upon being subjected to the predetermined impact force, or when the sensor detects that a threshold condition is reached.

As previously described, the module 700 can include a container for holding a flowable substance. When the container contains the liquid, heat dissipation for the power device can be improved. However, when the container is partially filled with the liquid, the liquid can drift or shake with motion of the mobile platform 100. When the mobile platform 100 changes travel direction, the center of mass of the mobile platform 100 needs to be changed within a short time. Inertia of the liquid can cause the mobile platform 100 to lose balance and even fall to the ground.

Thus, an anti-drift structure can be installed in the module 700 to obstruct the movement of the liquid. In the present disclosure, wherever a liquid is described in the disclosed methods, apparatus and systems, the liquid may be replaced by another flowable substance, without deviating from the concept covered in the scope of the present disclosure.

Figure 21:
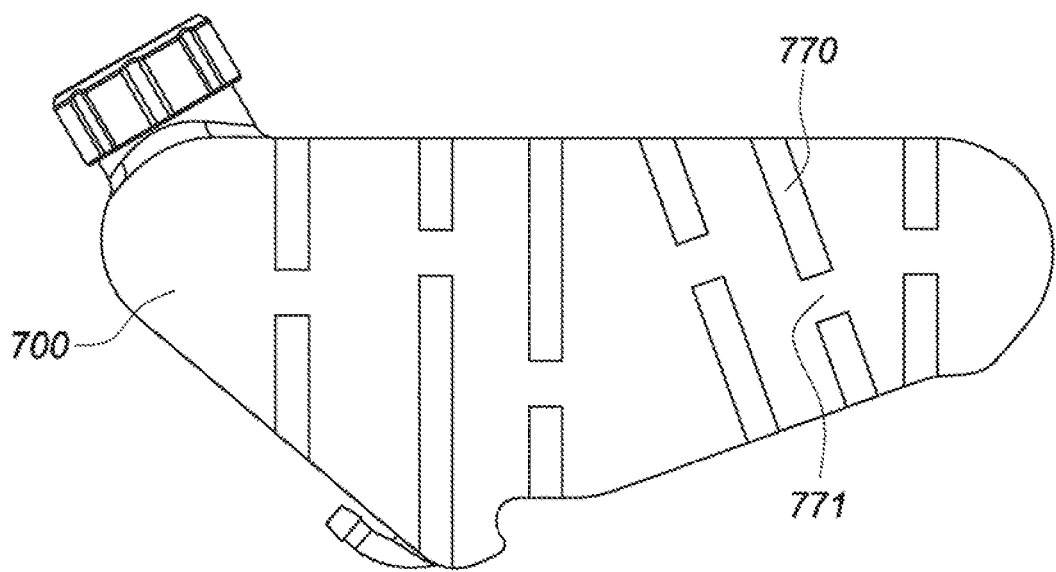
FIG. 21 is an exemplary structure diagram of an alternative embodiment of the module of FIG. 3, wherein the module has a spacer board installed therein.

The anti-drift structure can include a spacer board fixed at one or more locations within the module 700. FIG. 21 is an exemplary structure diagram of an alternative embodiment of the module 700 of FIG. 3, wherein the module 700 has a spacer board installed therein. The module 700 can have one or more spacer board 770 installed therein. Each spacer board 770 can be installed at a regular interval or random interval, and can be parallel or tilted relative to one or more other spacer boards 770. One or more holes 771 can be formed within each spacer board 770. In certain embodiments, between two adjacent spacer boards 770, the position of the holes can be misaligned. That is, a liquid may encounter obstacle when drifting in a direction vertical to the spacer boards 700 and moving from each spacer board 700 through the holes 771. The holes 771 on each spacer board 770 can include any arrangement for achieving anti-drift effect based on the movement of the mobile platform 100, without limitation.

Figure 22:
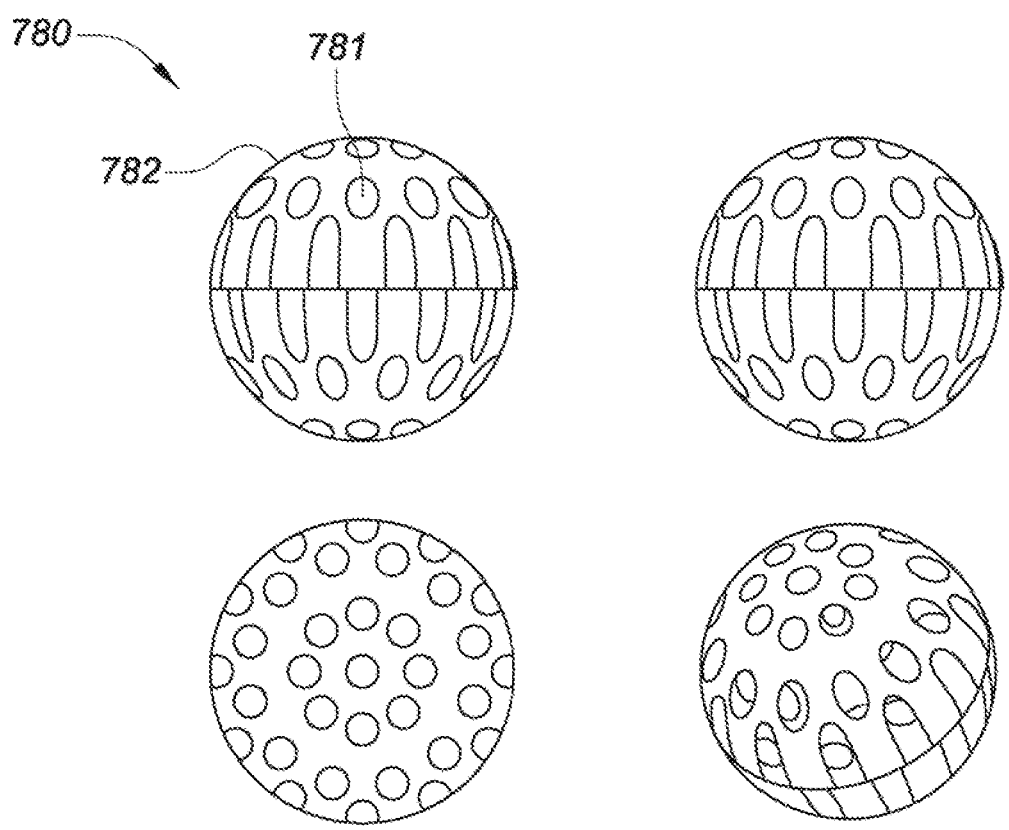
FIG. 22 is a detail drawing of an embodiment of hollow structures adapted to be placed in the module of FIG. 3.

Additionally and/or alternatively, the anti-drift structure can also include one or more hollow structures. FIG. 22 is a detail drawing of an embodiment of hollow structures 780 adapted to be placed in the module 700 of FIG. 3. The hollow structure 780 can thus be also referred to as an internal structure 780. The hollow structure 780 can include a shell 782 and one or more holes 781 thereon. Liquid can penetrate into the hollow structure 780 via the hole 781. Because liquid has to drift through the hole 781, the hollow structure 780 can partially block the liquid from drifting freely and thus restrict movement of the liquid.

The anti-drift structure is not limited to the hollow structures 780 illustrated in FIG. 22. For example, the anti-drift structure can include porous structures. A porous structure does not necessarily include the shell 782 and/or the holes 781 shown in FIG. 22. A porous structure can include a solid that is has any shape and/or size. An interior of the porous structure can include multiple pores for enabling a liquid to permeate the porous structure. The porous structure can inhibit the liquid from drifting freely and thus restrict movement of the liquid.

In certain embodiments, the hollow structure 780 can have a size (e.g., a diameter when the hollow structure includes a sphere) less than a size of the opening of the module 700 (covered by the lid 701 in FIG. 8). Thus, the hollow structure 780 can be placed into and removed out of the module 700 as desired. As a non-limiting example, the hollow structure 780 can have a diameter ranging from 60 mm to 100 mm. The number of hollow structures 780 in the module 700 is not limited in the present disclosure. The hollow structures 780 can partially and/or completely fill the interior of the module 700.

The number of holes 781 on the hollow structure 780 and size of the holes 781 can be adjusted according to specific requirements of the anti-drift function of a specific mobile platform 100 and size/shape of the module 700, without limitation. As a non-limiting example, the hollow structure 780 can have the number of holes 781 ranging from 5 to 30, and the hole 781 can have a diameter ranging from 5 mm to 15 mm. In general, a hole 781 having a great size may have less anti-drift effect, and a hole 781 having a small size may result in liquid residue in the hole when the liquid needs to be depleted from the module 700. The size of the hole 781 can be optimized based on viscosity of the liquid and requirements of the anti-drift ability.

Figure 23:
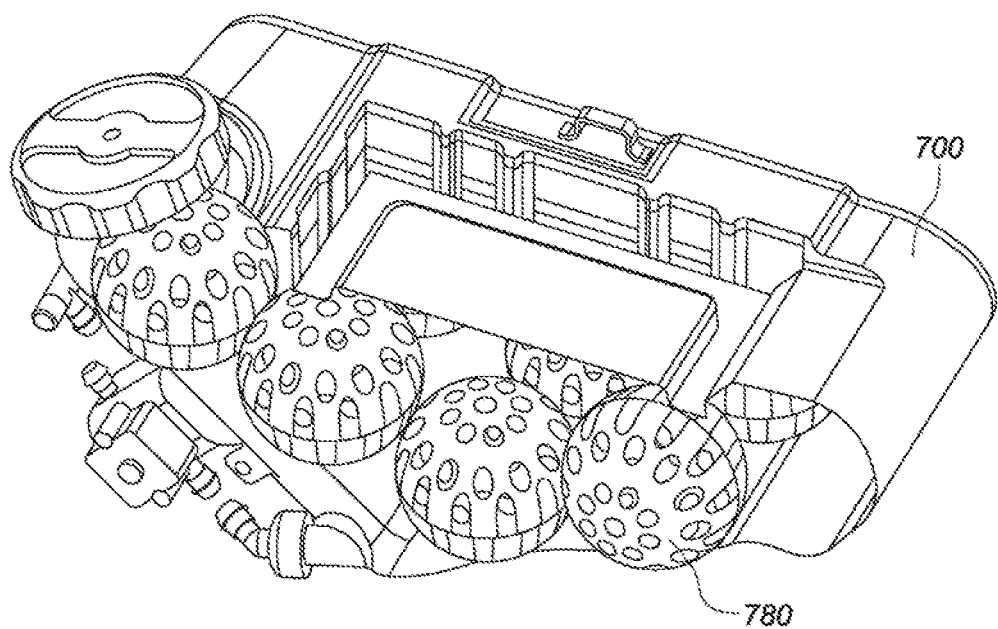
FIG. 23 is a detail drawing of an alternative embodiment of the module of FIG. 3, wherein a perspective view of the module is shown.

FIG. 23 is a detail drawing of an alternative embodiment of the module 700 of FIG. 3, wherein a perspective view of the module 700 is shown. FIG. 23 illustrates the module 700 as having therein hollow structures of FIG. 22. For illustrative purposes, a portion of the interior of the module 700 is opened to show the hollow structure 780 placed in the module 700.

Figure 24:
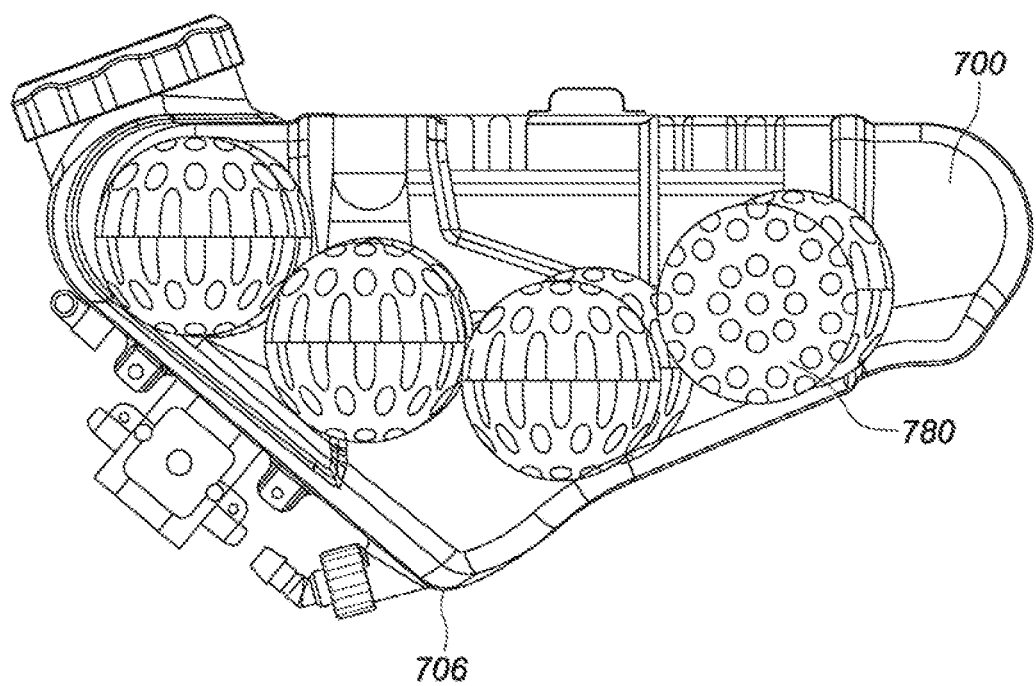
FIG. 24 is a detail drawing of another alternative embodiment of the module of FIG. 3, wherein a side view of the module is shown.

FIG. 24 is a detail drawing of another alternative embodiment of the module 700 of FIG. 3, wherein a side view of the module 700 is shown. FIG. 24 illustrates the module 700 as having therein hollow structures 780 of FIG. 22. For illustrative purposes, a portion of the interior of the module 700 is opened to show the hollow structure 780 placed in the module 700.

FIG. 22 illustrates the hollow structure 780 as a hollow sphere. However, the hollow structure 780 can also have other geometric bodies such as ellipsoid, cube, and the like, without limitation.

Figure 26:
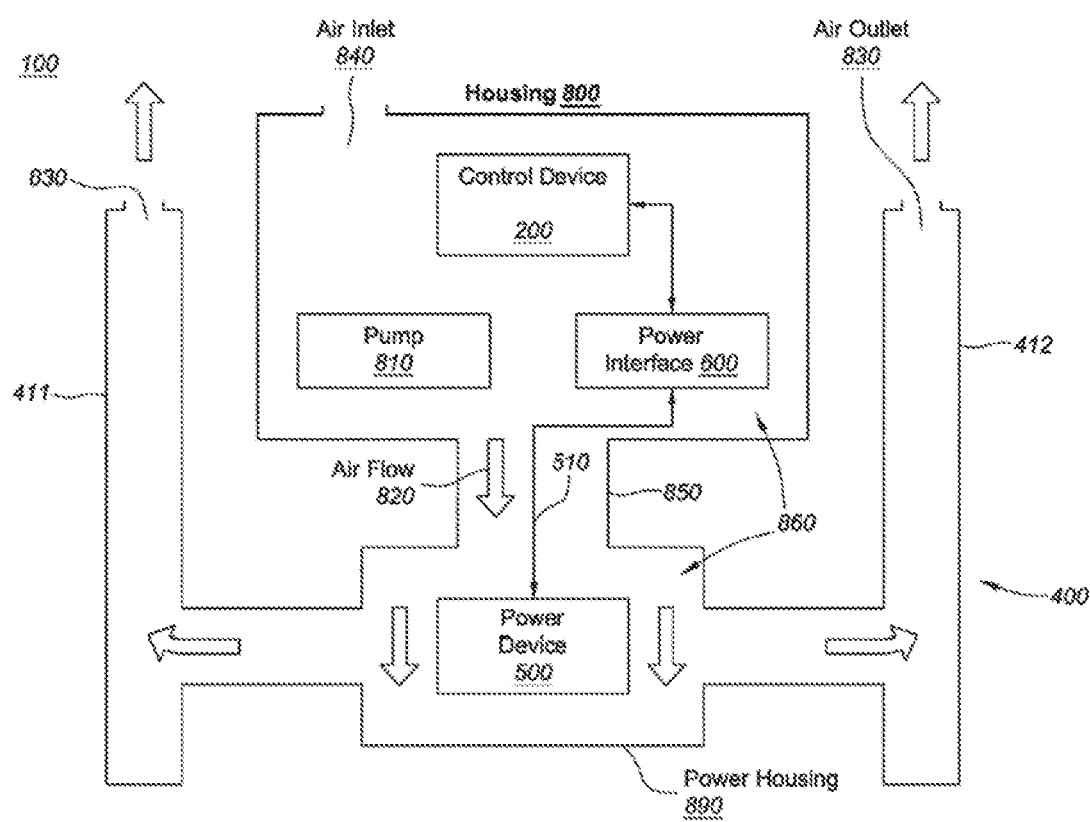
FIG. 26 is a block diagram illustrating another alternative embodiment of the mobile platform of FIG. 3, wherein the power device is installed in a power housing.

Optionally, the container can have a lowest-level position 706 (as shown in FIG. 26). The lowest-level position 706 can be located at a lowest point (i.e., a point closest to the ground) of the container when the mobile platform 100 is in an operating position. Thus, liquid remaining in the container can flow to the lowest-level position 706. The liquid can thus be completely drained via an opening at the lowest-level position 706.

Figure 25:
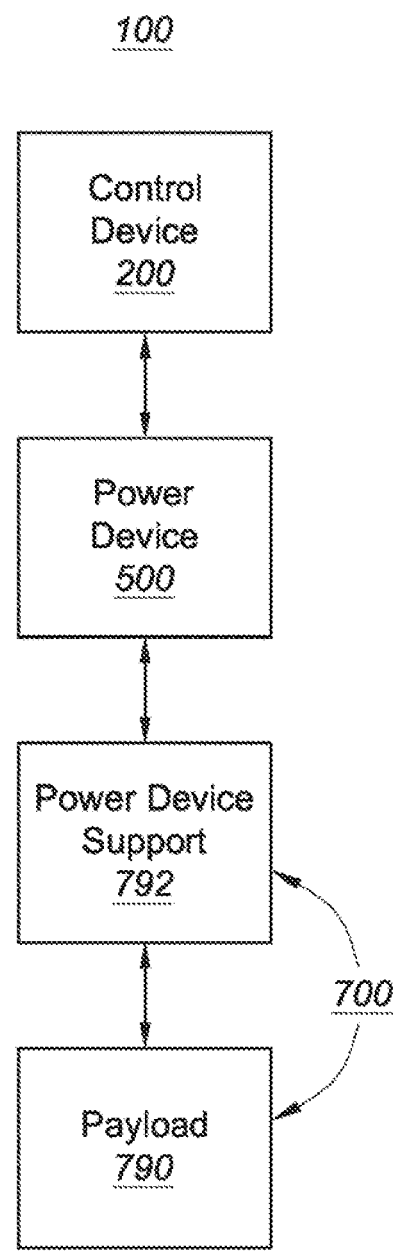
FIG. 25 is a top level block diagram illustrating an alternative embodiment of the mobile platform with the power device of FIG. 1, wherein the mobile platform includes a power device support.

Although FIG. 3 illustrates the module 700 as including the payload 790, the module 700 does not necessarily include only the payload 790. Alternatively and/or additionally, the module 700 can include a power device support. For example, FIG. 25 is a top level block diagram illustrating an alternative embodiment of the mobile platform 100 with the power device 500 and the module 700. The module 700 can include a power device support 792. The power device support 792 can comprise any structure for holding and/or otherwise supporting the power device 500. Exemplary structures for holding and/or otherwise supporting the power device 500 can include a box, a shelf, a cradle, a support frame, and/or the like, without limitation. In one example, the power device support 792 can be installed on, and/or integrated with, the payload 790 and hold and/or otherwise support the power device 500. In another example, the power device support 792 can be used for holding and/or otherwise supporting the power device 500 and can be connected to the mobile platform 100 without the need of connecting with the payload 790.

Various embodiments also provide a method for manufacturing the module 700 in FIG. 3. The method can include forming a container adapted to hold a flowable substance. A portion of, or all of, the disclosed structures for installing the power device 500 on the module 700 and coupling the module 700 to the mobile platform 100, and the spacer boards 770 can be formed as an integral part of the container by shaping the shell of the container. In a non-limiting example, the container can be made of a material including a polymer, e.g., polyvinyl chloride, polyethylene, polystyrene, and/or the like. Materials other than polymer can also be used. In a non-limiting example, the shell of the container can be made of a material having a Young's Modulus less than 20 GPa. The method can include making the container using a blow molding process, a compression molding process, and/or other conventional molding processes.

Further, the method for manufacturing the module 700 can further include manufacturing the hollow structures 780 adapted to be placed in the container. The hollow structures 780 can be made of a material, different from, similar to, or the same as the material of the container and can be made using a process similar to or the same as the manufacturing process for making the container.

Although FIGS. 8-20 illustrates the power device 500 as being exposed to the external operating environment of the mobile platform 100, the power device 500 can be located outside the control device 200 without necessarily being exposed to the external operating environment of the mobile platform 100.

For example, FIG. 26 is a block diagram illustrating another alternative embodiment of the mobile platform 100 of FIG. 3, wherein the power device 500 is installed in a power housing 890. The power housing 890 can communicate with the support member 400 (as shown in FIG. 3). The support member 400 is illustrated as including a first support member 411 and a second support member 412. For example, the first support member 411 and/or the second support member 412 can have a bar-shaped structure, or any other structures, without limitation. Although described as communicating with two support members 411, 412 for purposes of illustration only, the power housing 890 can communicate with one support member, or any suitable number of uniform and/or different support members.

The support members 411 and 412 can have a hollow and/or porous interior so air can flow therein. The power housing 890 can communicate with the housing 800 that encloses the control device 200. An air duct 850 can connect the power housing 890 and the housing 800. Thus, the support members 411 and 412, the air duct 850, the power housing 890, and the housing 800 can form an air-sealed chamber 860.

An air outlet 830 can be opened on the support members 411 and/or 412. An air inlet 840 can be opened on the housing 800. A pump 810 can be installed in the housing 800 for forming an air flow 820. The pump 810 can draw air from the external operating environment of the mobile platform 100. The air can enter the chamber 860 via the air inlet 840. The pump 810 can pressure the air into the power housing 890. The air can thus exit the chamber 860 via the air outlet 830.

Although described as being located in the housing 800 for purposes of illustration only, the pump 810 can be located in any suitable locations in the mobile platform 100. For example, the motor 300 (as shown in FIG. 3) can be enclosed in a housing that communicates with the housing 800. The pump 810 can be in the housing enclosing the motor 300. Additionally and/or alternatively, the pump 810 can be integrated with the motor 300. Regardless of the location of the pump 810, the pump 810 can be configured to generate the air flow 820 that can traverse the power housing 890.

As shown in FIG. 26, the power device 500 can be enclosed in the power housing 890. The power device connection 510 connecting the power device 500 and the power interface 600 can be enclosed in the air duct 850. Thus, in a harsh operating environment, the power device connection 510 and the power device 500 can be protected. Meanwhile, the air flow 820 can enter the power housing 890 from the housing 800. The power device 500 can be generally at a higher temperature than the control device 200 during operation of the mobile platform 100. Therefore, the air flow 820 from the housing 800 can be cooler than the power device 500, thereby effectively reducing the temperature of the power device 500.

Although described as connecting the power housing 890 with the housing 800 enclosing the control device 200 for purposes of illustration only, the air duct 850 can connect the power housing 890 with a housing enclosing any other component of the mobile platform 100. For example, the air duct 850 can connect the power housing 890 with the housing enclosing the motor 300. The air flow 820 can enter the power housing 890 from the housing enclosing the motor 300.

Figure 27:
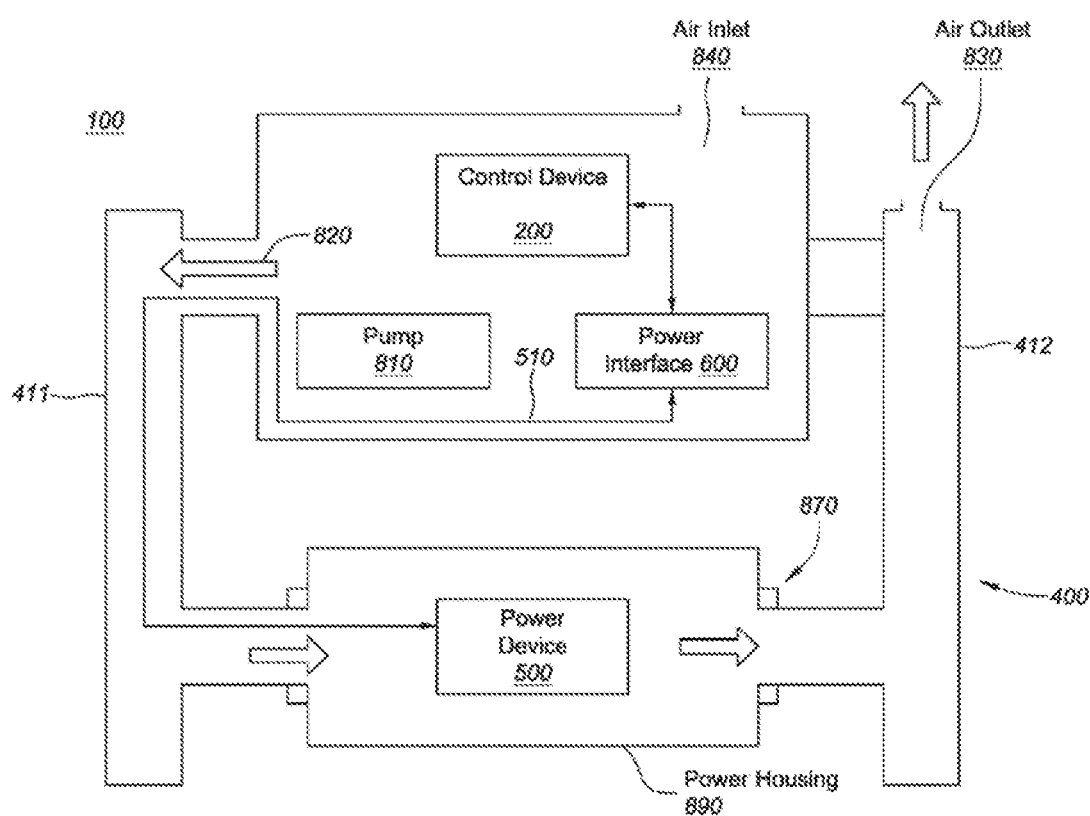
FIG. 27 is a block diagram illustrating an alternative embodiment of the mobile platform of FIG. 26, wherein an air flow enters the power housing via a first support member and exits the power housing via a second support member.

The power housing 890 does not necessarily connect with the housing 800 via the air duct 850. In certain cases, the air duct 850 can be omitted. For example, the support member 400 can be configured to connect the power housing 890 with the housing 800. FIG. 27 is a block diagram illustrating an alternative embodiment of the mobile platform of FIG. 26, wherein the air flow 820 enters the power housing 890 via the first support member 411 and exits the power housing 890 via the second support member 412. As shown in FIG. 27, the pump 810 can be configured to pump the air flow 820 into the power housing 890 via the first support member 411. The air flow 820 can traverse the power housing 890 to cool the power device 500, and then exit via the air outlet opened on the second support member 412.

As shown in FIG. 27, the first support member 411 and the second support member 412 can be coupled with the power housing 890 via a connection 430. The connection 430 can be configured to enable the quick release mechanism as shown in FIG. 18. Thus, when the first support member 411 and/or the second support member 412 are subjected to an impact force, and/or the control device 200 detects that a preset threshold condition is met, the power housing 890 can be released from the mobile platform 100, to reduce damage to the control device 200 during an accident.

Various embodiments also provide a kit for assembling a mobile platform. The kit can include one or more of the control device 200, the module 700, and the power device 500 as illustrated in FIGS. 1-27. The kit can be used for assembling the mobile platform instead of acquiring a factory-assembled mobile platform. In certain embodiments, an instruction manual can be included in the kit. The instruction manual may have instructions thereon. When the instructions are followed, the control device 200, the module 700, and/or the power device 500 can be assembled into the apparatus and/or the mobile platform as shown in the present disclosure.

Various embodiments also provide a kit for assembling an unmanned aerial vehicle (UAV). The kit can include one or more of the control device 200, the module 700), and the power device 500 as illustrated in FIGS. 1-27. The kit can be used for assembling the UAV instead of acquiring a factory-assembled UAV. In certain embodiments, an instruction manual can be included in the kit. The instruction manual may have instructions thereon. When the instructions are followed, the control device 200, the module 700, and/or the power device 500 can be assembled into the apparatus and/or the UAV as shown in the present disclosure.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A method for assembling a mobile platform with a power device, comprising:
   installing the power device in a recess having a depth extending from a surface toward an interior of a module configured to contain a flowable substance;
   coupling the module to a landing support member of the mobile platform, the landing support member extending from the module beyond a bottom surface of the module; and
   associating the power device with the mobile platform.

2. The method of claim 1, wherein the module is located outside a housing enclosing a control device associated with the mobile platform.

3. The method of claim 2, wherein the installing the power device in the recess having the depth extending from the surface toward the interior of the module outside the housing comprises installing the power device on a container configured to hold a liquid.

4. The method of claim 3, wherein the installing the power device on the container comprises installing the power device on the container with an internal anti-drift structure.

5. The method of claim 4, wherein the installing the power device on the container comprises:
   installing the power device on the container with an internal hollow structure; and
   enabling the internal hollow structure to be permeated by a liquid.

6. The method of claim 5, wherein the installing the power device on the container comprises enabling the internal hollow structure to fit through an opening of the container.

7. The method of claim 4, wherein the installing the power device on the container comprises:
   installing the power device on the container with an internal spacer board inside the container; and
   enabling the spacer board to restrict a movement of a liquid in the container.

8. The method of claim 2, further comprising enabling the module and a support member of the mobile platform to be coupled via a quick release mechanism, the support member comprising the landing support member of the mobile platform.

9. The method of claim 8, further comprising configuring the mobile platform to release the module and the power device upon being subjected to a predetermined impact force.

10. The method of claim 9, wherein the configuring comprises:
    enabling the support member to tilt in such a way that the support member is at an angle relative to a groundward direction when the mobile platform lands on a ground;
    enabling the angle to increase to a threshold angle value upon being subjected to the predetermined impact force; and
    enabling the mobile platform to release the module and the power device when the angle increases to the threshold angle value.

11. The method of claim 10, wherein the enabling the support member to tilt comprises enabling the support member to tilt at the angle ranging from 10 degrees to 35 degrees.

12. The method of claim 1, the installing comprising installing the power device outside a control device coupled with an unmanned aerial vehicle.

\* \* \* \* \*